US006891661B2

United States Patent
Hayashi et al.

(10) Patent No.: US 6,891,661 B2
(45) Date of Patent: May 10, 2005

(54) OPTICAL AMPLIFIER WITH PUMP LIGHT SOURCE CONTROL FOR RAMAN AMPLIFICATION

(75) Inventors: Etsuko Hayashi, Yamato (JP); Tomoto Tanaka, Kawasaki (JP); Yasushi Sugaya, Kawasaki (JP); Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 10/624,568

(22) Filed: Jul. 23, 2003

(65) Prior Publication Data

US 2004/0080813 A1 Apr. 29, 2004

Related U.S. Application Data

(62) Division of application No. 09/693,838, filed on Oct. 23, 2000, now Pat. No. 6,624,926.

(30) Foreign Application Priority Data

Aug. 25, 2000 (JP) ...................... 2000-255291

(51) Int. Cl.[7] ................................ H01S 3/00
(52) U.S. Cl. ...................... 359/334; 359/349
(58) Field of Search ............... 359/334, 341.3, 359/341.33, 349

(56) References Cited

U.S. PATENT DOCUMENTS

| | | | |
|---|---|---|---|
| 4,401,364 A | 8/1983 | Mochizuki | |
| 4,616,898 A | 10/1986 | Hicks, Jr. | |
| 4,805,977 A | 2/1989 | Tamura et al. | |
| 5,452,116 A * | 9/1995 | Kirkby et al. | 398/79 |
| 5,959,750 A | 9/1999 | Eskildsen et al. | 359/134 |
| 6,016,219 A * | 1/2000 | Fatehi et al. | 359/341.43 |
| 6,049,417 A * | 4/2000 | Srivastava et al. | 359/337.4 |
| 6,052,394 A | 4/2000 | Lee et al. | 372/6 |
| 6,115,174 A | 9/2000 | Grubb et al. | 359/334 |
| 6,151,160 A * | 11/2000 | Ma et al. | 359/337.12 |
| 6,236,498 B1 | 5/2001 | Freeman et al. | 359/341 |
| 6,292,288 B1 | 9/2001 | Akasaka et al. | 359/334 |
| 6,304,370 B1 * | 10/2001 | Barnard | 359/341.1 |
| 6,307,668 B1 * | 10/2001 | Bastien et al. | 359/337.1 |
| 6,466,362 B1 * | 10/2002 | Friedrich | 359/334 |
| 6,469,826 B1 * | 10/2002 | Masuda et al. | 359/349 |
| 6,483,636 B1 * | 11/2002 | Sugaya et al. | 359/349 |
| 6,510,000 B1 * | 1/2003 | Onaka et al. | 359/334 |
| 6,631,028 B1 * | 10/2003 | Islam | 359/349 |
| 6,731,877 B1 * | 5/2004 | Cao | 398/91 |
| 6,735,394 B1 * | 5/2004 | Yue et al. | 398/92 |

FOREIGN PATENT DOCUMENTS

| | | | |
|---|---|---|---|
| EP | 1 018 666 A1 | 7/2000 | ............. G02F/1/35 |
| JP | 2000-98433 | 4/2000 | ............. G02F/1/35 |

OTHER PUBLICATIONS

Kani, J., et al., "Fibre Raman amplifier for 1520 nm band WDM transmission," Electron. Letts., Sep. 3, 1998, vol. 34, No. 18, pp. 1745–1747.

Takeda, M., et al., "Active Gain–Tilt Equalization by Preferentially 1.43 μm–or 1.48 μm–Pumped Raman Amplification," OSA TOPS, vol. 30, pp. 101–105, Optical Society of America, Jun. 9–11, 1999.

* cited by examiner

Primary Examiner—Nelson Moskowitz
Assistant Examiner—Deandra M. Hughes
(74) Attorney, Agent, or Firm—Staas & Halsey LLP

(57) ABSTRACT

A Raman amplifier for amplifying a wavelength division multiplexed (WDM) light including signal lights wavelength division multiplexed together. The amplifier includes an optical amplifying medium and a controller. The optical amplifying medium uses Raman amplification to amplify the WDM light in accordance with multiplexed pump lights of different wavelengths traveling through the optical amplifying medium. The WDM light is amplified in a wavelength band divided into a plurality of individual wavelength bands. The controller controls power of each pump light based on a wavelength characteristic of gain generated in the optical amplifying medium in the individual wavelength bands.

19 Claims, 15 Drawing Sheets

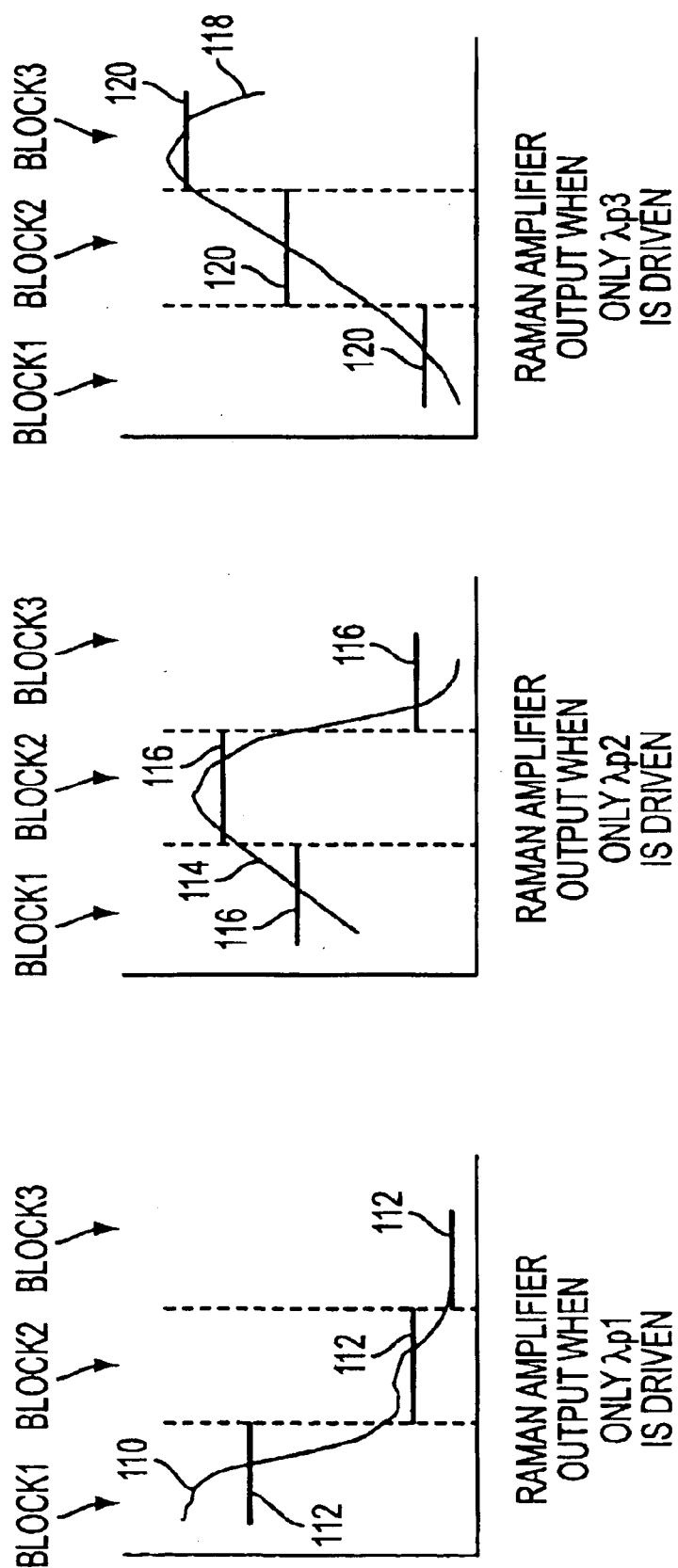

OPTICAL AMPLIFIER WITH PUMP LIGHT SOURCE CONTROL FOR RAMAN AMPLIFICATION

CROSS-REFERENCE TO RELATED APPLICATIONS

This application is a division of U.S. Ser. No. 09/693,838 filled Oct. 23, 2000 now U.S. Pat. No. 6,624,926.

This application is based on, and claims priority to, Japanese application number 2000-255291, filed Aug. 25, 2000, in Japan, and which is incorporated herein by reference.

This application is related to U.S. application Ser. No. 09/531,015, filed Mar. 20, 2000, and which is incorporated herein by reference.

BACKGROUND OF THE INVENTION

1. Field of the Invention

The present invention relates to a Raman amplifier for amplifying a signal light in an optical communication system. More particularly, the present invention relates to a Raman amplifier for amplifying wavelength division multiplexed signal lights.

2. Description of the Related Art

Almost all optical amplifiers used in current optical communication systems are rare-earth doped optical fiber amplifiers. Particularly, erbium (Er) doped optical fiber amplifiers (EDFA) are commonly used.

Moreover, with wavelength division multiplexing (WDM) optical communication systems, a plurality of signal lights at different wavelengths are multiplexed together and then transmitted through a single optical fiber. Since an EDFA has a relatively wide gain band, WDM optical communication systems use EDFAs to amplify the multiplexed signal lights. Therefore, with WDM optical communication systems using EDFAs, the transmission capacity of an optical fiber can be greatly increased.

Such WDM optical communication systems using EDFAs are extremely cost effective, since they can be applied to previously laid optical fiber transmission line to greatly increase the transmission capacity of the optical fiber transmission line. Moreover, an optical fiber transmission lines has virtually no limitation on bit rate since EDFAs can easily be upgraded in the future, as developments in optical amplifier technology occur.

Transmission loss of an optical fiber transmission line is small (about 0.3 dB/km or less) in the wavelength band of 1450 nm to 1650 nm, but the practical amplifying wavelength band of an EDFA is in a range of 1530 nm to 1610 nm. Thus, an EDFA is only effective for amplifying signals in a portion of the wavelength band of 1450 nm to 1650 nm.

In a WDM optical communication system, a predetermined transmission characteristic may be obtained by suppressing fluctuation of optical power among each channel to 1 dB or less in each optical repeating stage because the upper limit of optical power is caused by a non-linear effect and the lower limit by a receiving signal-to-noise ratio (SNR).

Here, a transmission loss wavelength characteristic of the transmission line and a dispersion compensation fiber or the like forming the WDM optical communication system must be reduced.

In a WDM optical communication system, the wavelength characteristic of transmission loss in a transmission line due to the induced Raman scattering provides the maximum influence on the wavelength characteristic of the signal light.

A key component of current WDM transmission systems is an EDFA that can amplify wavelength division multiplexed signal lights at the same time. For further improvement, such as increase of transmission capacity and realization of ultra-long distance transmission, it would be desirable to provide an optical amplifier which can amplify different wavelength bands than a conventional EDFA, while also providing the favorable characteristics of an EDFA.

In view of expanding the wavelength band of an optical amplifier to increase the transmission capacity of optical fibers, attention is being directed to a Raman amplifier.

A Raman amplifier can amplify the Stokes-shifted frequency that is shifted as much as the Raman shift of the amplifying medium from the frequency of a pump light. Therefore, a signal light can be amplified at a desired frequency with a pump light source producing a pump light of a desired wavelength.

SUMMARY OF THE INVENTION

Accordingly, it is an object of the present invention to provide a Raman amplifier for use in a WDM optical communication system.

More specifically, it is an object of the present invention to provide a control algorithm for a Raman amplifier using multiple pump light wavelengths or pump sources to attain a flat wavelength band over a wide band range.

It is also an object of the present invention to provide a control algorithm for a Raman amplifier that allows the amplifier to easily realize constant output power control, constant gain control and wavelength characteristic flattening control.

Additional objects and advantages of the invention will be set forth in part in the description which follows, and, in part, will be obvious from the description, or may be learned by practice of the invention.

The foregoing objects of the present invention are achieved by providing an optical amplifier including (a) an optical amplifying medium to Raman amplify a wavelength division multiplex (WDM) light including signal lights wavelength division multiplexed together; (b) pump light sources generating pump lights of different wavelengths; (c) a first optical multiplexer multiplexing the pump lights together; (d) a second optical multiplexer multiplexing the WDM light with the multiplexed pump lights; (e) a detector dividing the amplified WDM light into wavelength bands and detecting a power in each wavelength band; and (f) a pump light controller controlling power of each pump light based on a wavelength characteristic of gain generated in the optical amplifying medium for each wavelength bands, in accordance with the powers detected, by the detector.

Objects of the present invention are also achieved by providing an optical amplifier including (a) an optical amplifying medium to Raman amplify a wavelength division multiplex (WDM) light including signal lights wavelength division multiplexed together; (b) pump light sources generating pump lights of different wavelengths; (c) a first optical multiplexer multiplexing the pump lights together; (d) a second optical multiplexer multiplexing the WDM light with the multiplexed pump lights; (e) an input detector detecting power of the WDM light before being amplified by the optical amplifying medium; (f) an output detector detecting power of the amplified WDM light; and (g) a pump light controller controlling powers of the pump lights based on the power detected by the input detector and the power detected by the output detector.

Moreover, objects of the present invention are achieved by providing an optical amplifier including (a) an optical amplifying medium to Raman amplify a wavelength division multiplex (WDM) light including signal Lights wavelength division multiplexed together; (b) pump light sources generating pump lights of different wavelengths; (c) a first optical multiplexer multiplexing the pump lights together; (d) a second optical multiplexer multiplexing the WDM light with the multiplexed pump lights; (e) a decoupler decoupling a portion of the amplified WDM light; (f) a detector dividing the decoupled portion into wavelength bands and detecting a power in each wavelength band; and (g) a pump light controller controlling power of each pump light based on a wavelength characteristic of gain generated in the optical amplifying medium for each wavelength bands, in accordance with the powers detected by the detector.

Further, objects of the present invention are achieved by providing an optical amplifier including (a) an optical amplifying medium to Raman amplify a wavelength division multiplex (WDM) light including signal lights wavelength division multiplexed together; (b) pump light sources generating pump lights of different wavelengths; (c) a first optical multiplexer multiplexing the pump lights together; (d) a second optical multiplexer multiplexing the WDM light with the multiplexed pump lights; (e) an input detector dividing the WDM light before being amplified in the optical amplifying medium into wavelength bands, and detecting the power in each wavelength band; (f) an output detector dividing the amplified WDM light into the same wavelength bands as the input detector, and detecting the power in each wavelength band; and (g) a pump light controller controlling powers of the pump lights based on the powers detected by the input detector and the powers detected by the output detector.

In addition, objects of the present invention are achieved by providing an optical amplifier for amplifying a wavelength division multiplexed (WDM) light including signal lights wavelength division multiplexed together, the amplifier including (a) an optical amplifying medium to Raman amplify the WDM light in accordance with multiplexed pump lights of different wavelengths traveling through the optical amplifying medium, the WDM light being amplified in a wavelength band divided into a plurality of individual wavelength bands; and (b) a controller controlling power of each pump light based on a wavelength characteristic of gain generated in the optical amplifying medium in the individual wavelength bands.

Objects of the present invention are also achieved by providing an optical amplifier for amplifying a wavelength division multiplexed (WDM) light including signal lights wavelength division multiplexed together, the amplifier including (a) an optical amplifying medium to Raman amplify the WDM light in accordance with multiplexed pump lights of different wavelengths traveling through the optical amplifying medium, the WDM light being amplified in a wavelength band divided into a plurality of individual wavelength bands; and (b) a controller controlling output powers of the pump lights in accordance with differences in power of the WDM light before being amplified by the optical amplifying medium and after being amplified by the optical amplifying medium in each individual wavelength band.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 4(A), 4(B) and 4(C) are diagrams illustrating wavelength characteristics of a single pump light source block of a Raman amplifier, according to an embodiment of the present invention.

DESCRIPTION OF THE PREFERRED EMBODIMENTS

Figure 1:
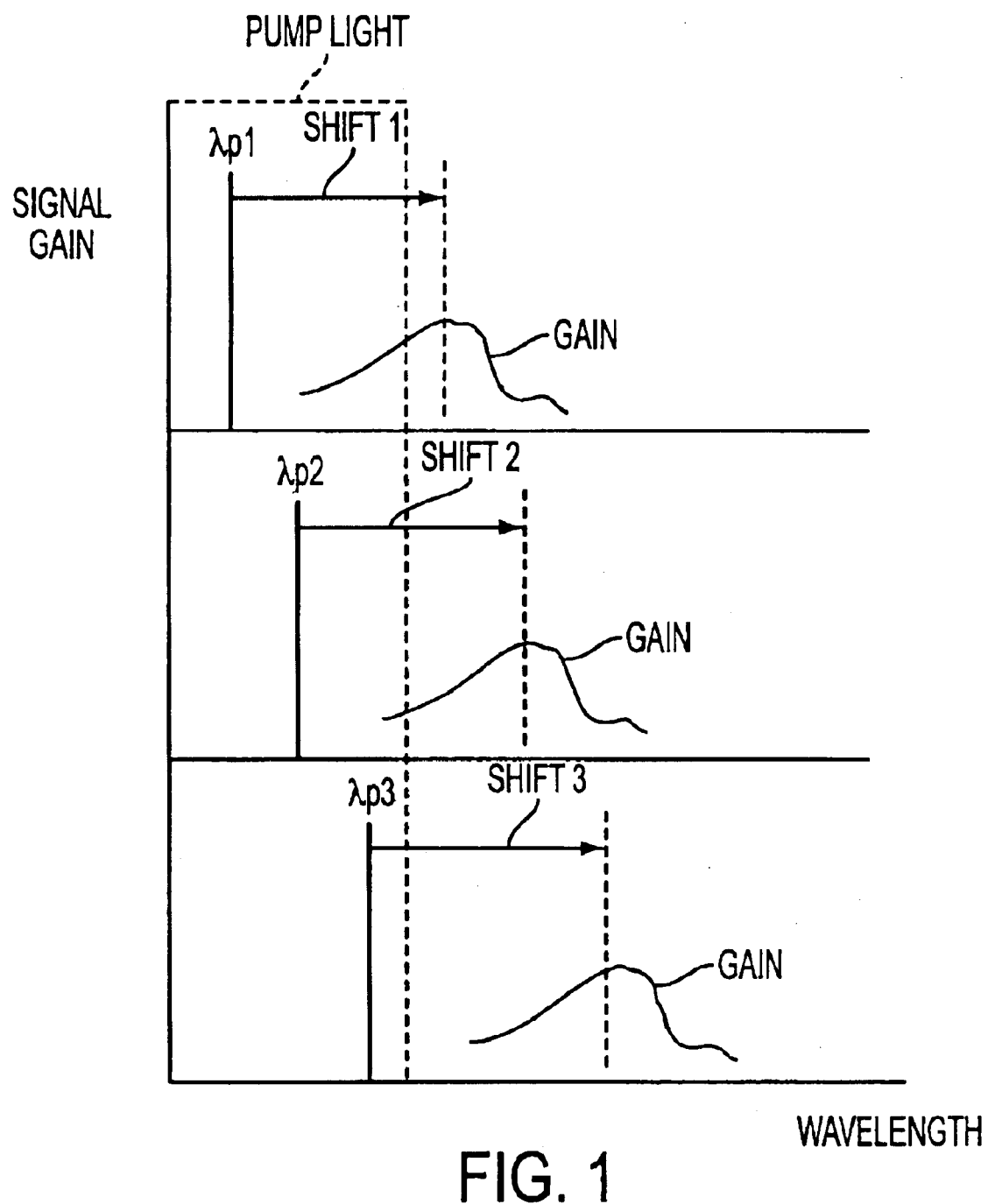
FIG. 1 is a diagram illustrating the relationship between a pump light and gain wavelength during Raman amplification, according to an embodiment of the present invention.

A Raman amplifier is used to compensate for output tilt of an EDFA.

In addition, attention is also paid to a Raman amplifier because the pump light is introduced into the transmission fiber. In this manner, the transmission fiber is used to compensate for deterioration of output using the transmission fiber as the Raman amplifying medium, to thereby provide transmission loss wavelength compensation of the transmission line due to the induced Raman scattering.

Raman amplifiers can mainly be considered for the following:

(1) Amplification outside of the wavelength band of EDFA.

(2) Improvement in output deviation compensation of an EDFA and improvement in optical SNR.

(3) Induced Raman scattering compensation of the transmission line.

In a WDM optical communication system, important characteristics for an optical amplifier are a wideband wavelength band, and a flat wavelength band.

It is now considered to use a plurality of pump lights of different wavelengths in view of realizing wide band transmission of a Raman amplifier. The Raman amplifier output is monitored or an output after insertion of an in-line amplifier after the Raman amplifier is monitored to control outputs of a plurality of pump LDs used to attain the band of the Raman amplifier to make small the output deviation.

When three or more pump light sources are used, the algorithms of the output power constant control or gain constant control and wavelength characteristic flattening control are extremely complicated.

Namely, with an increase in the number of pump wavelengths for realizing wide band and wavelength flattening or the number of pump light sources, more complicated control algorithms are required. Unfortunately, there are no conventionally known adequate algorithms.

Reference will now be made in detail to the present preferred embodiments of the present invention, examples of which are illustrated in the accompanying drawings, wherein like reference numerals refer to like elements throughout.

FIG. 1 is a diagram illustrating the relationship between a pump light and gain wavelength during Raman amplification, according to an embodiment of the present invention. Referring now to FIG. 1, pumps lights $\lambda_{p1}$, $\lambda_{p2}$, and $\lambda_{p3}$ are pump lights for a Raman amplifier, and have associated Raman shifts of shift1, shift2 and shift 3, respectively. The center wavelength of gain and the gain bandwidth are shifted to a longer wavelength side as much as the shift of pump wavelength when the pump wavelength is shifted to the longer wavelength side.

Therefore, a Raman amplifier generates a gain at a respective wavelength that is shifted in amount of Raman shift of the amplifying medium from the pump light wavelength. The Raman shift amount and Raman bandwidth are intrinsically given to a substance (amplifying medium). Thus, Raman amplification is an optical amplification technique in which gain can be obtained at any desired wavelength if a pump light source having a desired wavelength can be provided.

Figure 2:
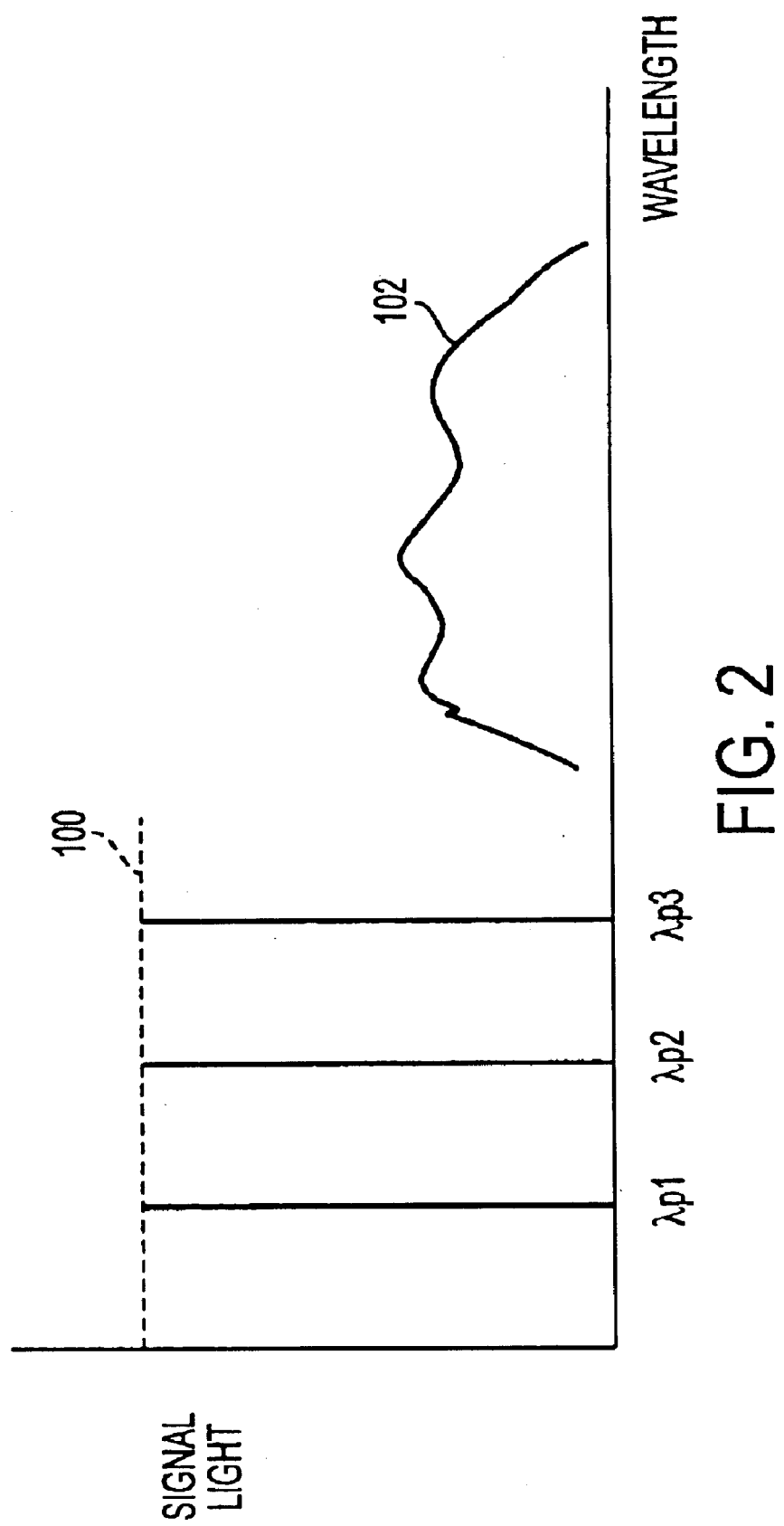
FIG. 2 is a diagram illustrating enlargement of bandwidth of a Raman amplifier by multiplexing different wavelengths of different pump light sources, according to an embodiment of the present invention.

FIG. 2 is a diagram illustrating enlargement of bandwidth of a Raman amplifier by multiplexing different wavelengths of different pump light sources, according to an embodiment of the present invention. Referring now to FIG. 2, a plurality of pump light sources provide pumps lights with wavelengths $\lambda_{p1}$, $\lambda_{p2}$, and $\lambda_{p3}$, which together form pump light 100 applied to an amplifying medium. Wavelengths $\lambda_{p1}$, $\lambda_{p2}$, and $\lambda_{p3}$ are slightly different from each other. In this manner, gain 102 providing wideband optical amplification can be realized.

Figure 3:
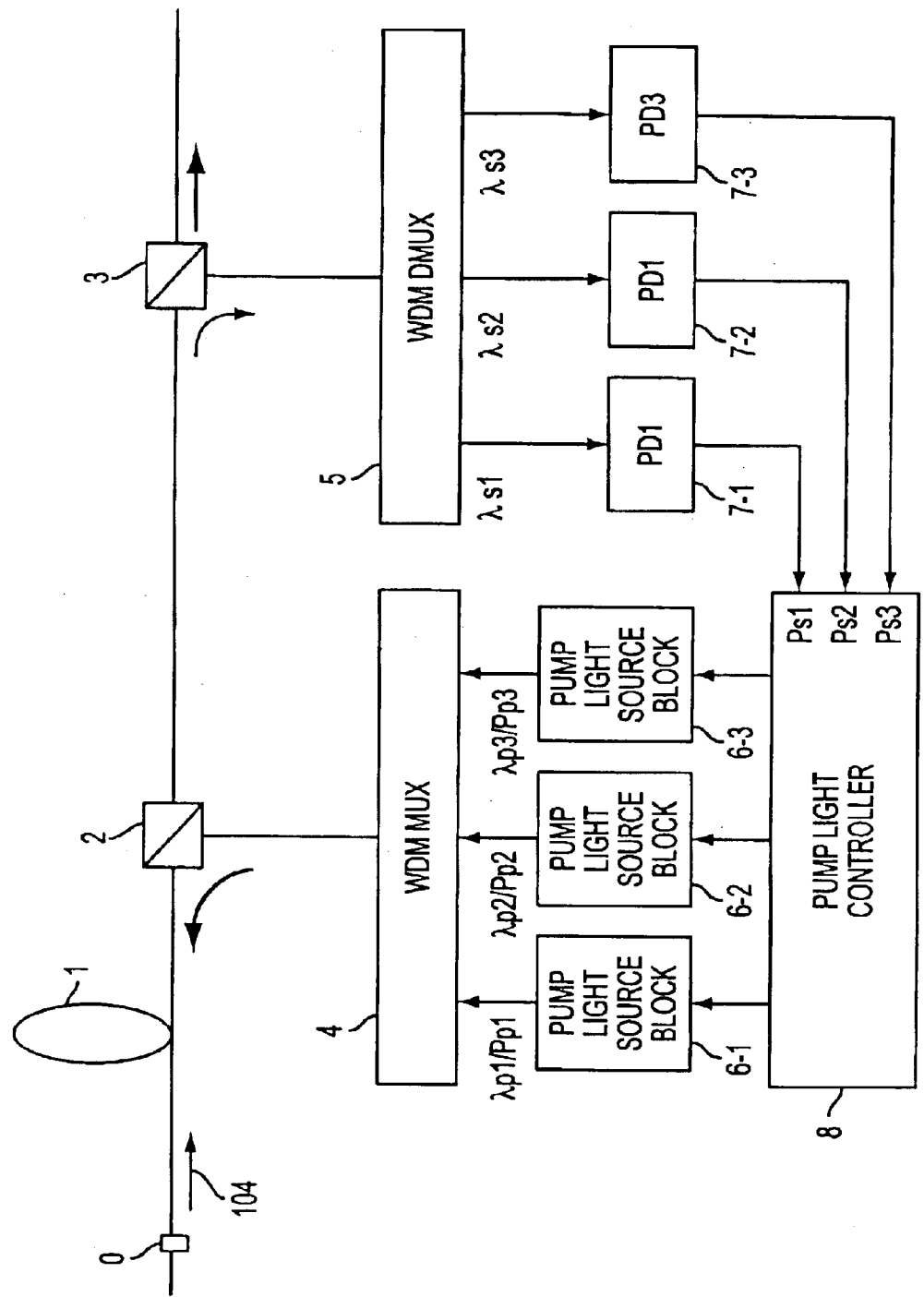
FIG. 3 is a diagram illustrating a Raman amplifier, according to an embodiment of the present invention.

FIG. 3 is a diagram illustrating a Raman amplifier, according to an embodiment of the present invention. Referring now to FIG. 3, the Raman amplifier includes an input port 0, a Raman amplifying medium 1, a multiplexing coupler 2, a demultiplexing coupler 3, a multiplexing coupler 4, a wavelength branching coupler 5, pump light source blocks 6-1, 6-2 and 6-3, light receiving elements 7-1, 7-2 and 7-3 and a pump light controller 8.

A wavelength division multiplexed (WDM) light 104 including a plurality of signal lights multiplexed together is incident to back pumped Raman amplifying medium 1 from the input port 0.

Multiplexing coupler 4 is a wavelength multiplexing coupler multiplexing the pump lights of average wavelength of $\lambda_{p1}$, $\lambda_{p2}$, and $\lambda_{p3}$ of different center wavelengths from pump light source blocks 6-1, 6-2 and 6-3, respectively.

Multiplexing coupler 2 is a wavelength multiplexing coupler multiplexing, in Raman amplifying medium 1, the multiplexed pump lights from multiplexing coupler 4 with signal lights traveling through Raman amplifying medium 1.

Demultiplexing coupler 3 is a light splitter demultiplexing the wavelength-multiplexed light amplified in Raman amplifying medium 1 with a ratio of, for example, 10:1.

Wavelength demultiplexing coupler 5 is a wavelength band demultiplexing coupler demultiplexing the Raman gain wavelength band generated with the pump light from pump light source blocks 6-1, 6-2 and 6-3 into monitor blocks 1, 2 and 3 (not illustrated in FIG. 3). Each monitor block 1, 2 and 3 has a corresponding wavelength band. Light receiving elements 7-1, 7-2 and 7-3 receive the wavelength bands, respectively, corresponding to monitor blocks 1, 2 and 3, respectively, and perform optical/electric conversion.

Pump light controller 8 controls the output powers of average wavelengths $\lambda_{p1}$, $\lambda_{p2}$, and $\lambda_{p3}$ of pump light source blocks 6-1, 6-2 and 6-3 in accordance with the output of the signal light receiving elements 7-1, 7-2 and 7-3.

Control performed by pump light controller 8 will be explained below.

The average pump wavelength of pump light source block 6-1 is defined as $\lambda_{p1}$, and the output power of the pump light source block 6-1 is defined as $P_{p1}$. The average pump wavelength of the pump light source block 6-2 is defined as $P_{p2}$, and the output power of pump light source block 6-2 is defined as $P_{p2}$. The average pump wavelength of pump light source block 6-3 is defined as $\lambda_{p3}$, and the output power of pump light source block 6-3 is defined as $P_{p3}$.

The average output power of the average wavelength $\lambda_{s1}$ of the wavelength band of the monitor block 1 received with the light receiving element 7-1 is defined as $P_{s1}$. The average output power of the average wavelength $\lambda_{s2}$ of the wavelength band of the monitor block 2 received with the light receiving element 7-2 is defined as $P_{s2}$. The average output power of the average wavelength $\lambda_{s3}$ of the wavelength band of the monitor block 3 received with the light receiving element 7-3 is defined as $P_{s3}$.

FIGS. 4(A), 4(B) and 4(C) are diagrams illustrating wavelength characteristics of a single pump light source block of a Raman amplifier, according to an embodiment of the present invention.

More specifically, FIG. 4(A) is a diagram illustrating a wavelength division multiplexed light output from the amplifier when only pump light source block 6-1 is operated in the average pump wavelength of $\lambda_{p1}$ and average pump output power of $P_p$. Referring now to FIG. 4(A), a fine solid line 110 indicates the output spectrum while a thick solid line 112 indicates the average output power of each wavelength band monitor block by driving only $P_{pi}$.

FIG. 4(B) is a diagram illustrating a wavelength division multiplex light output from the amplifier when only pump light source block 6-2 is operated in the average pump wavelength $\lambda_{p2}$ and average pump output power of $P_{p2}$. A fine solid line 114 indicates the output spectrum while a thick solid line 116 indicates the average output power of each wavelength band monitor block by driving only $P_{p2}$.

FIG. 4(C) is a diagram illustrating a wavelength division multiplex light output from the amplifier when only pump light source block 6-3 is operated in the average pump wavelength $\lambda_{p3}$ and average pump output power of $P_{p3}$. A fine solid line 118 indicates the output spectrum while a thick solid line 120 indicates the average output power of each wavelength band monitor block by driving only $P_{p3}$.

As can be seen from FIGS. 4(A), 4(B) and 4(C), pump light source block 6-1 provides a maximum contribution to the signal light output of monitor block 1. Pump light source block 6-2 provides a maximum contribution to the signal light output of monitor block 2. Pump light source block 6-3 provides a maximum contribution to the signal light output of monitor block 3.

Simultaneously, pump light source block 6-1 also makes some contribution to the signal light output of monitor block 2 and the signal light output of monitor block 3. Pump light source block 6-2 makes some contribution to the signal light output of monitor block 1 and the signal light output of monitor block 2. Pump light source block 6-3 makes some contribution to the signal light output of monitor block 1 and signal light output of monitor block 2.

Therefore, pump lights of a plurality of wavelengths can used to form a wideband optical amplifier. At least one of the pump lights can be controlled, and will influence the other wavelength band monitor blocks.

In order to obtain a predetermined amplified signal power, a gain coefficient is multiplied by the power of a pump light source. Therefore, when the average power variation of the pump light outputs of the pump light source blocks 6-1 to 6-3 is defined as $\Delta P_p$, the variation of average output power of the band in which the gain is generated with the pump lights from the light receiving elements 7-1 to 7-3 is defined as $\Delta P_s$ and the average gain coefficient is defined as A, the following Formula 1 can be determined $$\Delta P_s = A \cdot \Delta P_p \qquad \text{Formula 1}$$

To eliminate output power wavelength characteristic deviation of each wavelength block, $\Delta P_p$ can be adjusted to make identical the power levels of the wavelength-multiplex signal lights of wavelength bands demultiplexed into three bands with the wavelength demultiplexing coupler 5. $\Delta P_p$ can be adjusted, for example, by varying an optical output power of the pump light source, by varying the pump wavelength to shift the center of gravity wavelength and also by varying the pump light wavelength width. Here, an example of adjustment for varying an optical output power will be explained.

As illustrated in FIGS. 4(A), 4(B) and 4(C), since the gain wavelength band generated by one pump light source block is wide and the gain is generated over each monitor block, when one pump light source block is varied, Formula 1 must be calculated, considering the influence on the wavelength of the other monitor blocks.

In other words, regarding the power of each monitor block, an output power of each pump light source block should be controlled based on the wavelength characteristic of the gain generated in the optical amplifying medium of each pump light source block.

Here, the average gain coefficient of the average output power variation $\Delta P_{p1}$ of the pump wavelength $\lambda_{p1}$ of the pump light source block 6-1 affecting on the average output power variation $\Delta P_{s1}$ of the monitor block 1 is defined as $A_{11}$. The average gain coefficient of the average output power variation $\Delta P_{p1}$ of the pump wavelength $\lambda_{p1}$ of the pump light source block 6-1 affecting on the average output power variation $\Delta P_{s2}$ of the monitor block 2 is defined as $A_{21}$. The average gain coefficient of the average output power variation $\Delta P_{p1}$ of the pump wavelength $\lambda_{p1}$ of the pump light source block 6-1 affecting on the average output power variation $\Delta P_{s3}$ of the monitor block 3 is defined as $A_{31}$.

The average gain coefficient of the average output power variation $\Delta P_{p2}$ of the pump wavelength $\lambda_{p2}$ of the pump light source block 6-2 affecting on the average output power variation $\Delta P_{s1}$ of the block 1 of the monitor block is defined as $A_{12}$. The average gain coefficient of the average output power variation $\Delta P_{p2}$ of the pump wavelength $\lambda_{p2}$ of the pump light source block 6-2 affecting on the average output power variation $\Delta P_{s2}$ of the monitor block 2 is defined as $A_{22}$. The average gain coefficient of the average output power variation $\Delta P_{p2}$ of the pump wavelength $\lambda_{p2}$ of the pump light source block 6-2 affecting on the average output power variation $\Delta P_{s3}$ of the monitor block 3 is defined as $A_{32}$.

The average gain coefficient of the average output power variation $\Delta P_{p3}$ of the pump wavelength $\lambda_{p3}$ of the pump light source block 6-3 affecting on the average output power variation $\Delta P_{s1}$ of the monitor block 1 is defined as $A_3$. The average gain coefficient of the average output power variation $\Delta P_{p3}$ of the pump wavelength $\lambda_{p3}$ of the pump light source block 6-3 affecting on the average output power variation $\Delta P_{s2}$ of the monitor block 2 is defined as $A_{23}$. The average gain coefficient of the average output power variation $\Delta P_{p3}$ of the pump wavelength $\lambda_{p3}$ of the pump light source block 6-3 affecting on the average output power variation $\Delta P_{s3}$ of the monitor block 3 is defined as $A_{33}$.

Figure 5C:
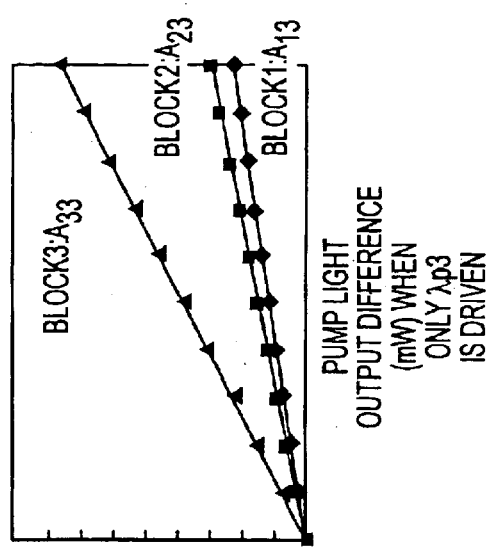
FIGS. 5(A), 5(B) and 5(C) are diagrams illustrating wavelength characteristics of single pump light source block of a Raman amplifier, according to an embodiment of the present invention.
Figure 5B:
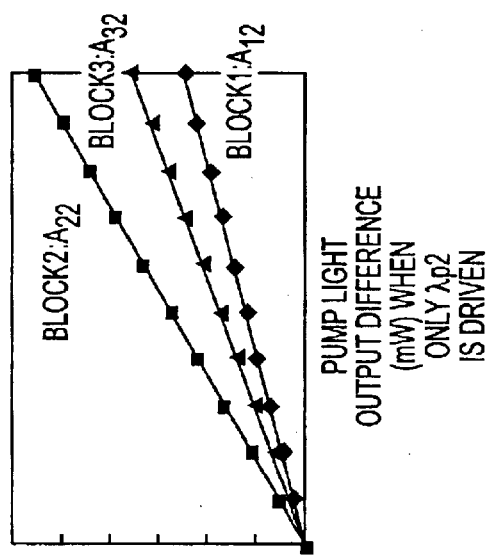
Figure 5A:
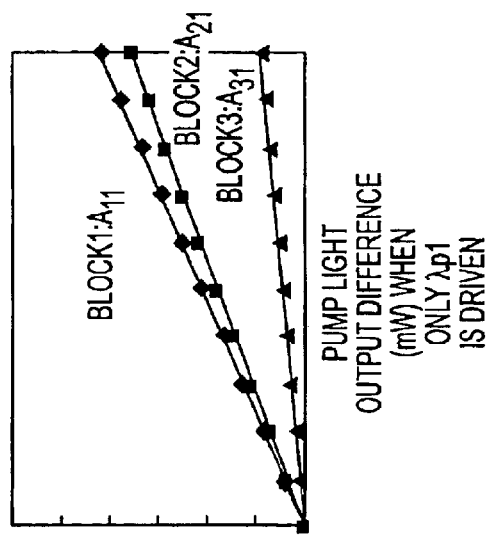

FIGS. 5(A), 5(B) and 5(C) are diagrams illustrating wavelength characteristics of a single pump light source block of a Raman amplifier, according to an embodiment of the present invention.

More specifically, FIG. 5(A) illustrates the average output power difference of the monitor block 1, the monitor block 2 and the monitor block 3 for the pump light output power difference when only the pump light source block 6-1 is operated. Respective gradients correspond to $A_{11}, A_{21}, A_{31}$.

FIG. 5(B) illustrates the average output power difference of the monitor block 1, the monitor block 2 and the monitor block 3 for the pump light output power difference when only the pump light source block 6-2 is operated. Respective gradients correspond to $A_{12}, A_{22}, A_{32}$.

FIG. 5(C) illustrates the average output power difference of the monitor block 1, the monitor block 2 and the monitor block 3 for the pump light output power difference when only the pump light source block 6-3 is operated. Respective gradients correspond to $A_{13}, A_{23}, A_{33}$.

Here, the average gain coefficient matrix [A] including these elements can be obtained.

$$\begin{bmatrix} \Delta P_{S1} \\ \Delta P_{S2} \\ \Delta P_{S3} \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} \Delta P_{P1} \\ \Delta P_{P2} \\ \Delta P_{P3} \end{bmatrix} \qquad \text{Formula 2}$$

Figures 6A, 6B:
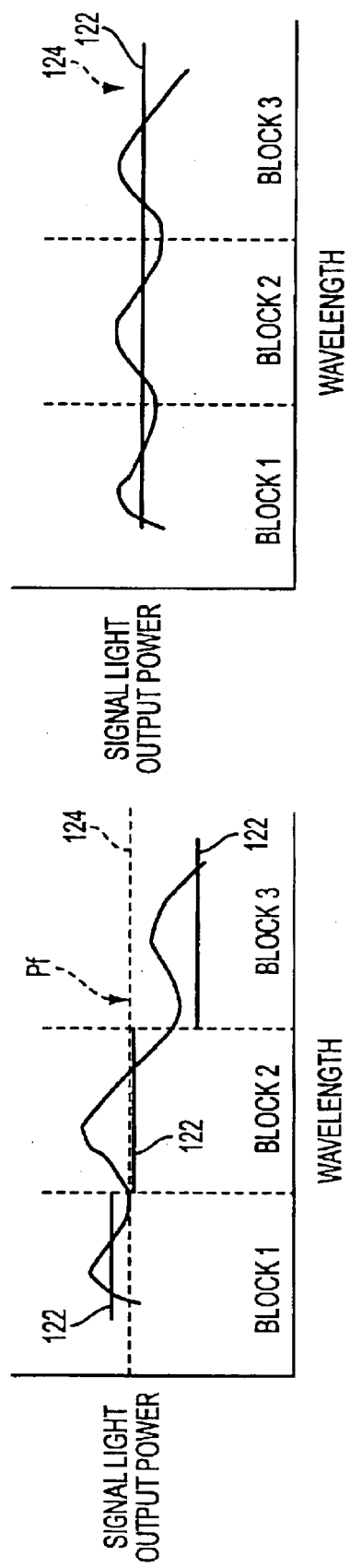
FIGS. 6(A) and 6(B) are diagrams illustrating control to obtain a constant wavelength characteristic, according to an embodiment of the present invention.

FIGS. 6(A) and 6(B) are diagrams illustrating control to obtain a constant wavelength characteristic, according to an embodiment of the present invention.

Referring now to FIG. 6(A), the average output of the monitor block 1, the monitor block 2 and the monitor block 3 when the wavelength characteristic of the signal light output has a large signal light spectrum is indicated with a thick solid line 122 and the average output $P_f$ of the total wavelength band is indicated with a broken line 124.

Reduction of the wavelength characteristic deviation of the wavelength multiplex light output indicates that the average outputs $P_{s1}$, $P_{s2}$ and $P_{s3}$ of monitor blocks 1, 2 and 3, respectively, are matched, as illustrated in FIG. 6(B), with the target Raman-amplified wavelength multiplex light output $P_f$ (average output of total wavelength band).

$$\Delta P_{s1} = |P_f - P_{s1}|$$
$$\Delta P_{s2} = |P_f - P_{s2}|$$
$$\Delta P_{s3} = |P_f - P_{s3}| \quad \text{Formula 3}$$
$$\Delta P_{s1} \approx \Delta P_{s2} \approx \Delta P_{s3} \quad \text{Formula 4}$$

Output difference (tilt) can be suppressed small in the total wavelength band where the Raman gain is generated in the Raman amplifying medium 1 by calculating the compensation amount of the pump light outputs $P_{p1}$, $P_{p2}$ an $P_{p3}$ of the pump light source blocks 6-1, 6-2 and 6-3, respectively, to satisfy the above formula.

$$\begin{bmatrix} \Delta P_{P1} \\ \Delta P_{P2} \\ \Delta P_{P3} \end{bmatrix} = \begin{bmatrix} A_{11} & A_{12} & A_{13} \\ A_{21} & A_{22} & A_{23} \\ A_{31} & A_{32} & A_{33} \end{bmatrix}^{-1} \begin{bmatrix} \Delta P_{S1} \\ \Delta P_{S2} \\ \Delta P_{S3} \end{bmatrix} \quad \text{Formula 5}$$

Namely, it is enough for the pump light controller 8 of FIG. 3 to control the pump light power output from each pump light source block 6-1, 6-2 and 6-3 by (a) monitoring the output power by dividing the wavelength-multiplex light where a plurality of signal lights are wavelength-multiplexed into the monitor blocks of the predetermined wavelength band, (b) executing the average value process obtained by dividing total output of the monitor block of each wavelength band with the number of channels, and (c) calculating, with the Formula 5, the average output power difference (tilt) of the pump light for weighting the influence on the wavelength of each monitor block of the pump wavelength of each pump light source block required to reduce the output power difference in the total wavelength band.

Moreover, the feedback control might typically be performed, for example, up to about ten (10) times until the predetermined wavelength characteristic deviation is obtained.

With these control processes, the average power of the Raman gain wavelength band generated with the pump light can be set to the constant power $P_f$.

Figure 7:
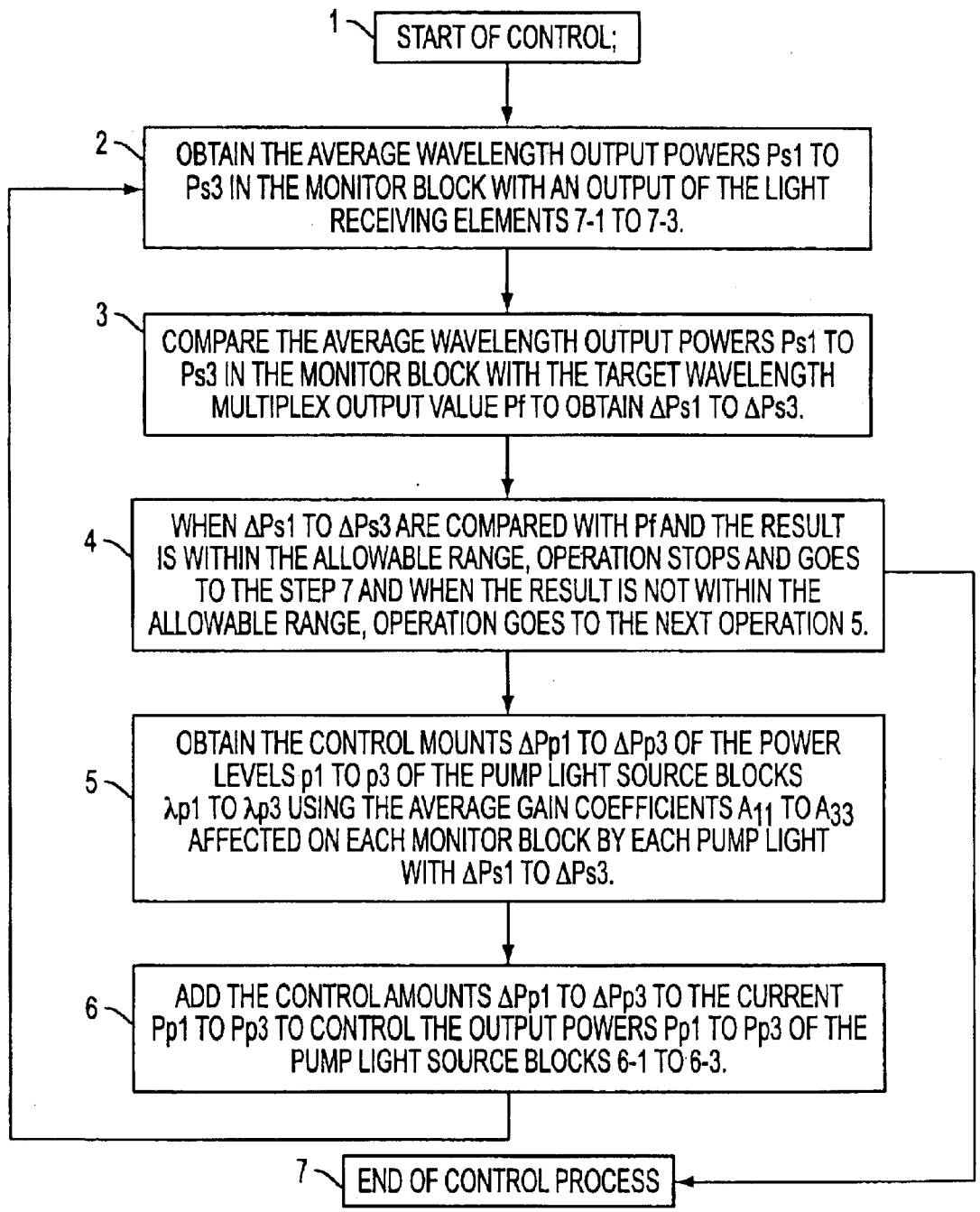
FIG. 7 is a flowchart illustrating the operation of a pump light controller in FIG. 3, according to an embodiment of the present invention.

FIG. 7 is a flowchart illustrating a process performed by pump light controller 8 in FIG. 3, according to an embodiment of the present invention. The processes in FIG. 7 can be performed, for example, such a processor, such as a CPU.

Referring now to FIG. 7, in operation 1, the control process is started.

From operation 1, the process moves to operation 2, where the average output powers $P_{s1}$, $P_{s2}$ and $P_{s3}$ in the monitor blocks 1, 2 and 3, respectively, are obtained from the outputs of the light receiving elements 7-1, 7-2 and 7-3, respectively.

From operation 2, the process moves to operation 3, where $\Delta P_{s1}$, $\Delta P_{s2}$ and $\Delta P_{s3}$ are obtained by comparing the average wavelength output powers $P_{s1}$, $P_{s2}$ and $P_{s3}$ in the monitor block 1, 2 and 3, respectively, with the target wavelength multiplex output value $P_f$.

From operation 3, the process moves to operation 4, where it is determined whether the difference between $\Delta P_{s1}$ to $\Delta P_{s3}$ and $P_f$ is within an allowable range. If the difference is within the allowable range, the process moves to operation 7 where the process stops. If the difference is not within the allowable range, the process moves to operation 5, where control amounts $\Delta P_{p1}$, $\Delta P_{p2}$ and $\Delta P_{p3}$ of the power levels $P_{p1}$, $P_{p2}$ and $P_{p3}$ of the pump light source blocks 6-1, 6-2 and 6-3 are obtained, from $\Delta P_{s1}$, $\Delta P_{s2}$, $\Delta P_{s3}$, using the inverse matrix of the average gain coefficients $A_{11}$ to $A_{33}$ which are affected on each monitor block by each pump light.

From operation 5, the process moves to operation 6, where the output powers $P_{p1}$, $P_{p2}$ and $P_{p3}$ of the pump light source blocks 6-1, 6-2, 6-3, respectively, are controlled by adding the control amounts $\Delta P_{p1}$, $\Delta P_{p2}$, $\Delta P_{p3}$ to the current $P_{p1}$, $P_{p2}$, $P_{P3}$, respectively.

From operation 6, the process moves to operation 7, where control process is completed.

In FIG. 3, as an example, a total pump light source block is provided as the three pump light source blocks 6-1, 6-2 and 6-3, and the total monitor block of the wavelength band that generates the gain through the pump light from the pump light source block is divided into three monitor blocks. However, the present invention is not limited to a total pump light source block provided "three" pump light source blocks, or a total monitor block as divided into "three" monitor blocks. Instead, the number of pump light source blocks of the total pump light source block and the number of monitor blocks of the total monitor block can be set to any practical number, which would typically be a matter of design choice.

Figure 8:
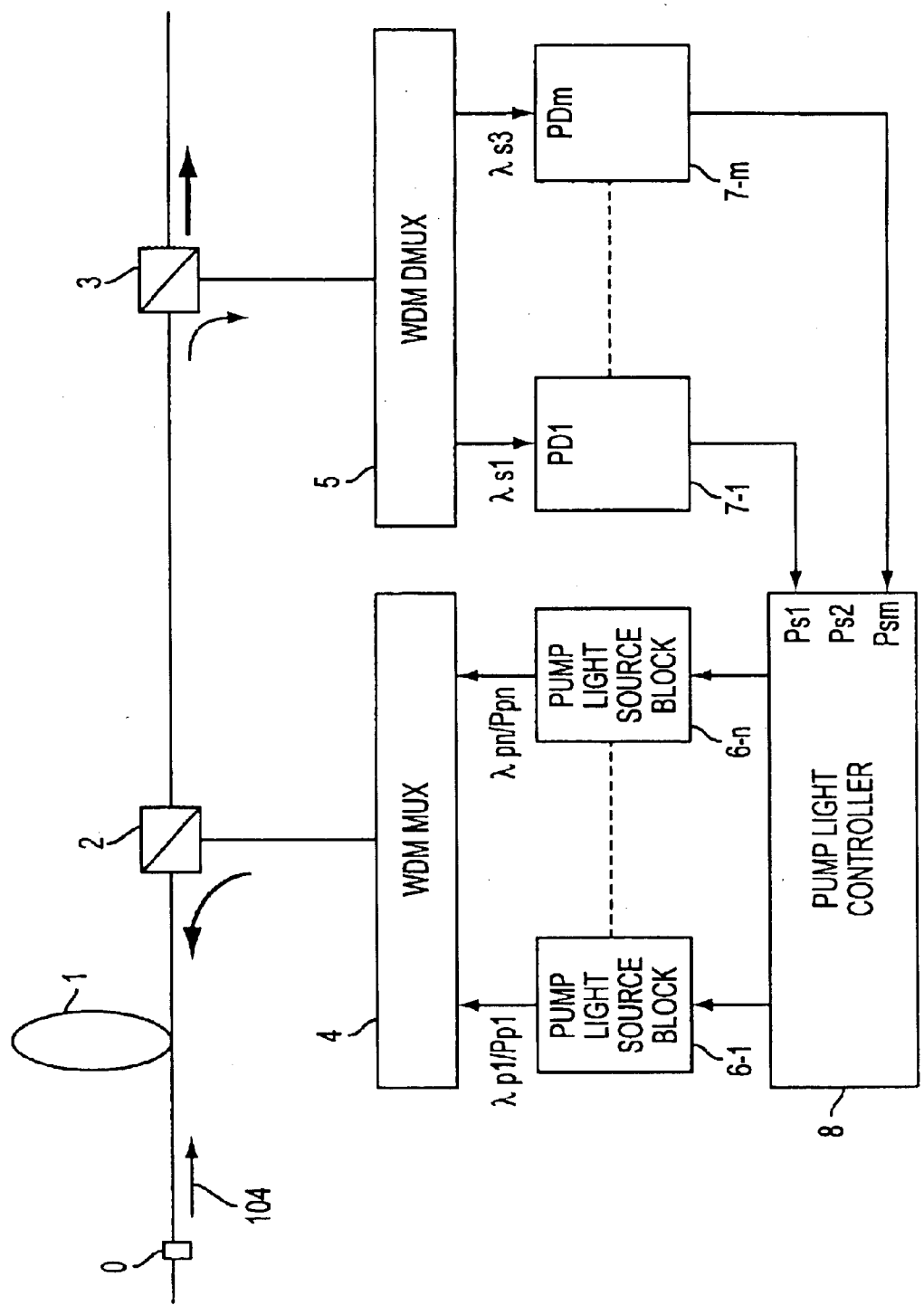
FIG. 8 is a diagram illustrating a Raman amplifier, according to an embodiment of the present invention.

For example, FIG. 8 is a diagram illustrating a Raman amplifier, according to an additional embodiment of the present invention. In FIG. 8, the number of pump light source blocks and monitor blocks can be set freely. Thus, in FIG. 8, n pump light source blocks (6-1 to 6-n) and m monitor blocks of the wavelength multiplex signal light are provided.

Figure 9:
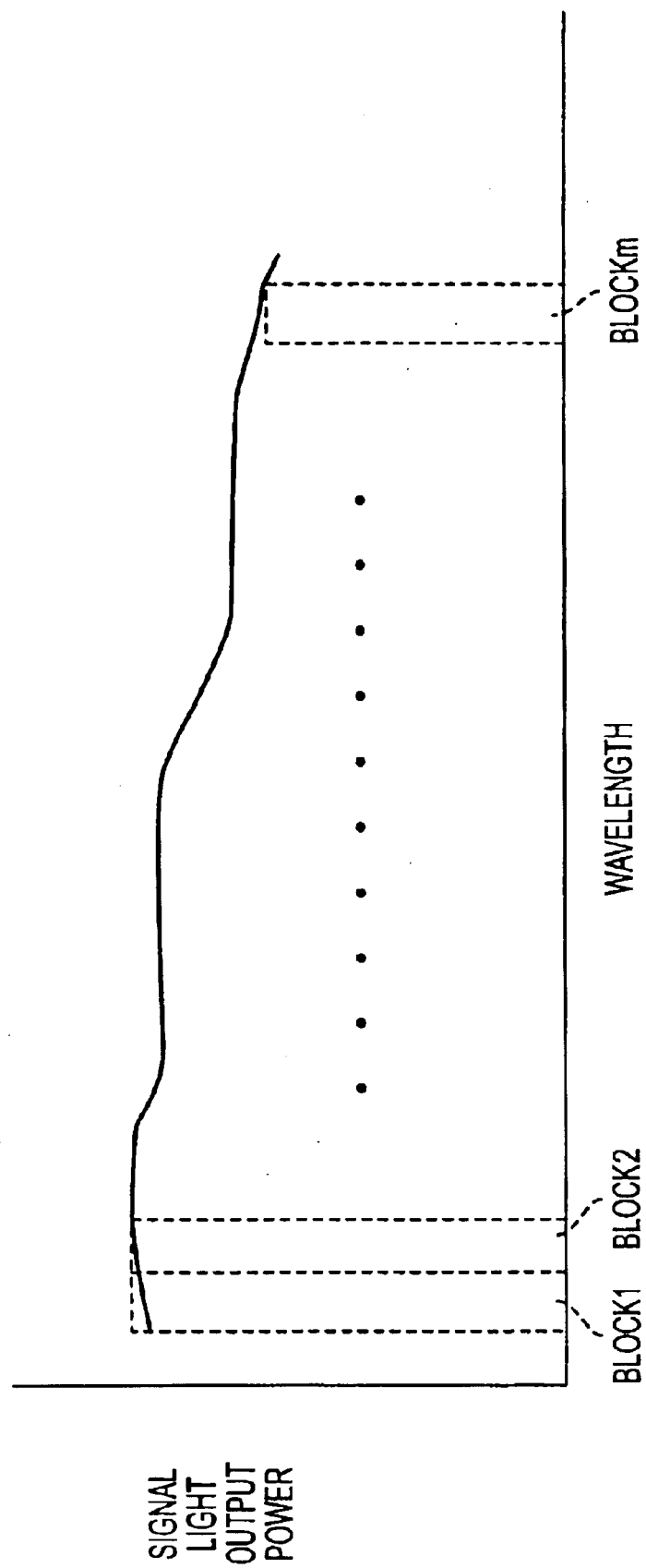
FIG. 9 is a diagram illustrating a wavelength characteristic when a desired number of monitor blocks are used in a Raman amplifier, according to an embodiment of the present invention.

FIG. 9 is a diagram illustrating a wavelength characteristic when a desired number of monitor blocks are used in a Raman amplifier, according to an embodiment of the present invention. More specifically, FIG. 9 illustrates the wavelength band of the Raman amplification gain for the wavelength division multiplexed light decoupled by wavelength demultiplex coupler 5 in FIG. 8, with the wavelength band being divided into m monitor blocks.

Variation $\Delta P_p$ of the pump light power control is expressed as an n×1 matrix. Difference $\Delta P_s$ between the average value of the wavelength multiplex signal light power in the monitor block and the target control value is expressed as the m×1 matrix. A is expressed as the n×m matrix.

$$\begin{bmatrix} \Delta P_{S_1} \\ \Delta P_{S_2} \\ \vdots \\ \Delta P_{S_n} \end{bmatrix} = \begin{bmatrix} A_{11} & A_{12} & \vdots & A_{1m} \\ A_{21} & A_{22} & \vdots & A_{2m} \\ \vdots & \vdots & \vdots & \vdots \\ A_{n1} & A_{n2} & \vdots & A_{nm} \end{bmatrix} \begin{bmatrix} \Delta P_{p1} \\ \Delta P_{p2} \\ \vdots \\ \Delta P_{p_M} \end{bmatrix} \quad \text{Formula 6}$$

$\Delta P_{pi}$, in this case, is variation of the average output power of the pump light source, while $\Delta P_{p1}$ is variation of the average output power of the signal light monitor block.

Since variation is used, it is not required to convert the monitor output power to the main signal output power.

Here, it is understood that $\Delta P_{pi}$ resulting from $\Delta P_{sj}$ can be obtained by obtaining the inverse matrix $[A]^{-1}$ of $[A]$.

$$\begin{bmatrix} \Delta P_{P_1} \\ \Delta P_{P_2} \\ \vdots \\ \Delta P_{P_m} \end{bmatrix} = A^{-1} \begin{bmatrix} \Delta P_{S_1} \\ \Delta P_{S_2} \\ \vdots \\ \Delta P_{S_n} \end{bmatrix} \quad \text{Formula 7}$$

Therefore, reduction of deviation of the average output power among each block indicates flattening of the wavelength characteristic of the signal light output power.

In the embodiment of FIG. 3, the desired number of pump light source blocks and monitor blocks is not limited to any particular number and can be determined in accordance with design choice. However, it is preferable that the number of monitor blocks be less than the number of signal light channels multiplexed to the wavelength multiplex light, and exceeding the number of pump light source blocks.

Figure 10:
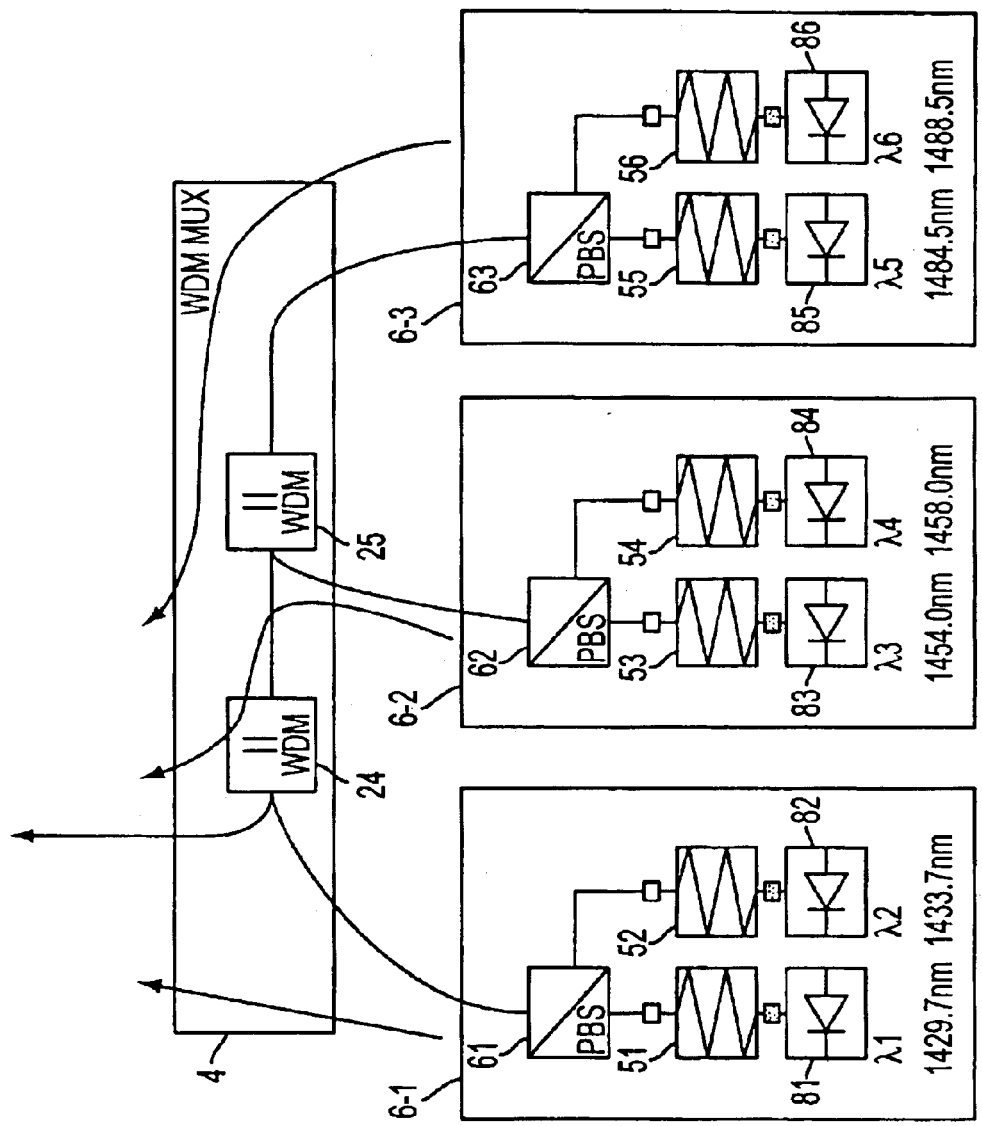
FIG. 10 is a diagram illustrating a practical structure of a pump light source block and a wavelength multiplexing coupler in the Raman amplifiers of FIGS. 3 and 8, according to an embodiment of the present invention.

FIG. 10 is a diagram illustrating a practical structure of a pump light source block and a wavelength multiplexing coupler in the Raman amplifiers of, for example, FIGS. 3 and 8, according to an embodiment of the present invention. Referring now to FIG. 10, the embodiment includes WDM couplers 24 and 25, deflection composite couplers 61, 62 and 63, fiber grating filters 51, 52, 53, 54, 55 and 56, and semiconductor lasers 81, 82, 83, 84, 85 and 86.

The pump light source block 6-1 includes semiconductor lasers 81 and 82. The pump light source block 6-2 includes semiconductor lasers 83 and 84. The pump light source block 6-3 includes semiconductor lasers 85 and 86. Semiconductor lasers 81 and 82 have slightly different wavelengths. Semiconductor lasers 83 and 84 have slightly different wavelengths. Semiconductor lasers 85 and 86 have slightly different wavelengths. In the example of FIG. 10, the various pairs of semiconductor lasers have wavelengths which are about 4 nm apart, but the present invention is not limited to this specific wavelength difference.

The pump lights from the semiconductor lasers 81 and 82 are at, for example, wavelengths 1429.7 nm and 1433.7 nm, respectively, and are reflected at the fiber grating filters 51 and 52, respectively, to provide a resonance structure to output a pump light of the particular wavelength. PBS coupler 61 multiplexes these pump lights, to provide a pump light provided by pump light source block 6-1.

The pump lights from the semiconductor lasers 83 and 84 are at, for example, wavelengths 1454.0 nm and 1458.0 nm, respectively, and are reflected at the fiber grating filters 53 and 54, respectively, to provide a resonance structure to output a pump light of the particular wavelength PBS coupler 62 multiplexes these pump lights, to provide a pump light provided by pump light source block 6-2.

The pump lights from the semiconductor lasers 85 and 86 at, for example, wavelengths 1484.5 nm and 1488.5 nm, respectively, and are reflected at the fiber grating filters 55 and 56, respectively, to provide a resonance structure to output a pump light of the particular wavelength. PBS coupler 63 multiplexes these pump lights, to provide a pump light provided by pump light source block 6-3.

The polarization coupling by PBS couplers 61, 62 and 63 is performed, for example, to eliminate dependence on change of the Raman amplification.

The multiplex coupler 4 includes the WDM couplers 24 and 25. The WDM coupler 25 operates, for example, by reflecting the wavelength light from the pump light source block 6-2 and transferring the wavelength from the pump light source block 6-3. The WDM coupler 24 operates, for example, by reflecting the wavelength light from the pump light source block 6-1 and transferring the wavelength from the pump light source block 6-3.

In FIG. 10, in each pump light source block 6-1, 6-2 and 6-3, the various semiconductor laser-fiber grating pairs output light which is slightly different in wavelength from each other. However, the present invention is not limited to this, and equal wavelength can be output. Moreover, the light of each pump light source block is not required to be formed with a plurality of semiconductor lasers. For example, a pump light of a pump light source block can be formed by a single light source which does not depend on polarization.

In FIG. 3, the target wavelength multiplex light output value is defined as $P_f$ and the average powers of all wavelength bands are controlled to become equal to $P_f$. Therefore, it is possible to perform control to obtain constant output in all wavelength bands.

As a modified example of this constant output control, $P_f$ is defined as $P_{f1}$, $P_{f2}$, $P_{f3}$ for each wavelength band, or monitor block, of the total monitor block and these values are compared to conduct individual constant output control in the individual monitor blocks.

In this case, $P_{f1}$, $P_{f2}$, $P_{f3}$ correspond to monitor blocks 1, 2 and 3, respectively, in place of $P_f$ in operation 4 of the flowchart of FIG. 7.

The pump light controller 8 may also be controlled by subtracting the corresponding $P_{s1}$, $P_{s2}$, $P_{s3}$ from the values $P_{f1}$, $P_{f2}$, $P_{f3}$.

Figure 11:
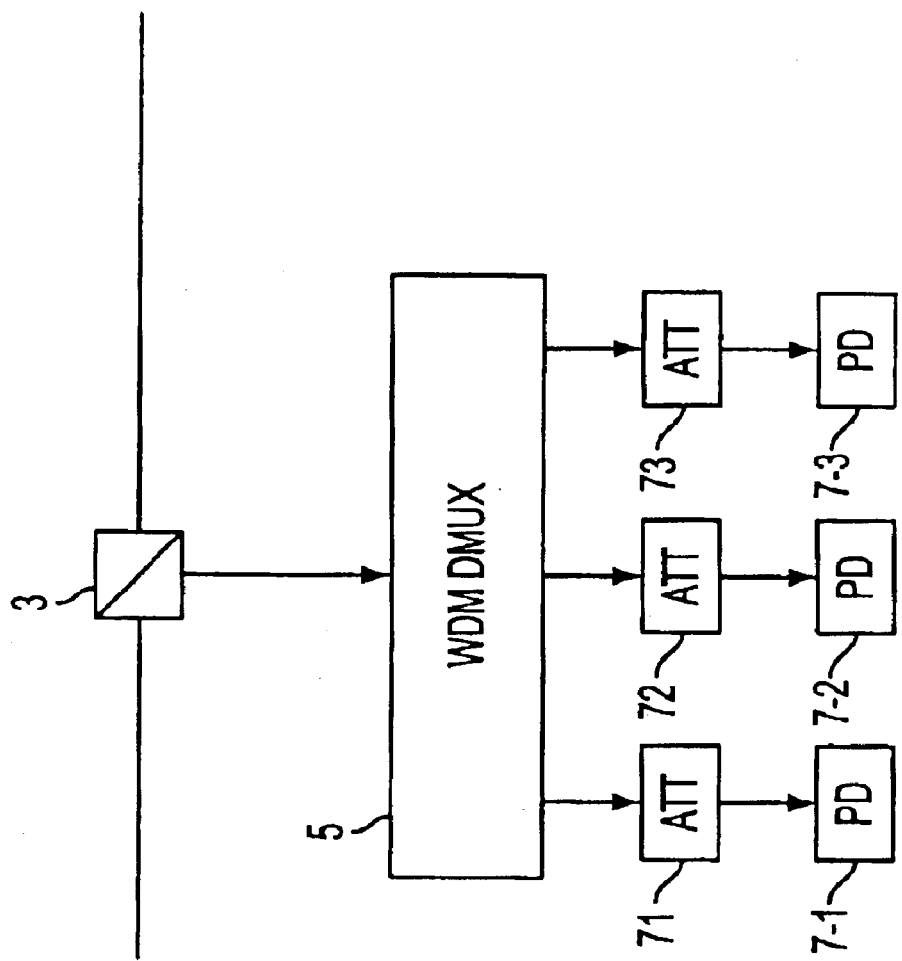
FIG. 11 is a diagram illustrating a portion of a Raman amplifier, according to an embodiment of the present invention.

FIG. 11 is a diagram illustrating a portion of a Raman amplifier, according to an embodiment of the present invention. Referring now to FIG. 11, weighting can be performed freely in monitor blocks 1, 2 and 3 to conduct constant output control individually in monitor blocks 1, 2 and 3, by providing, in place of changing $P_f$, variable or fixed attenuators 71, 72 and 73 in the preceding stage of the light receiving elements 7-1, 7-2 and 7-3 of FIG. 3.

Moreover, the embodiment in FIG. 3 can freely use, as the Raman amplifying medium, for example, dispersion compensation fiber (DCF) resulting in small effective sectional area and large non-linearity, dispersion shifted fiber (DSF) and non-zero dispersion shifted fiber (NZDSF), as well as the ordinary 1.3 zero-micron fiber.

When fibers having large non-linearity are used, the length of the fiber that operates as the Raman amplifying medium to obtain the necessary gain can be shortened. Therefore, centralized amplification can be realized.

In the embodiment of FIG. 3, the wavelength:demultiplex couplers 3 and 5, and light receiving elements 7-1, 7-2 and 7-3, are used to provide a monitor block. Instead, however, a spectrum analyzer can be used.

Figure 12:
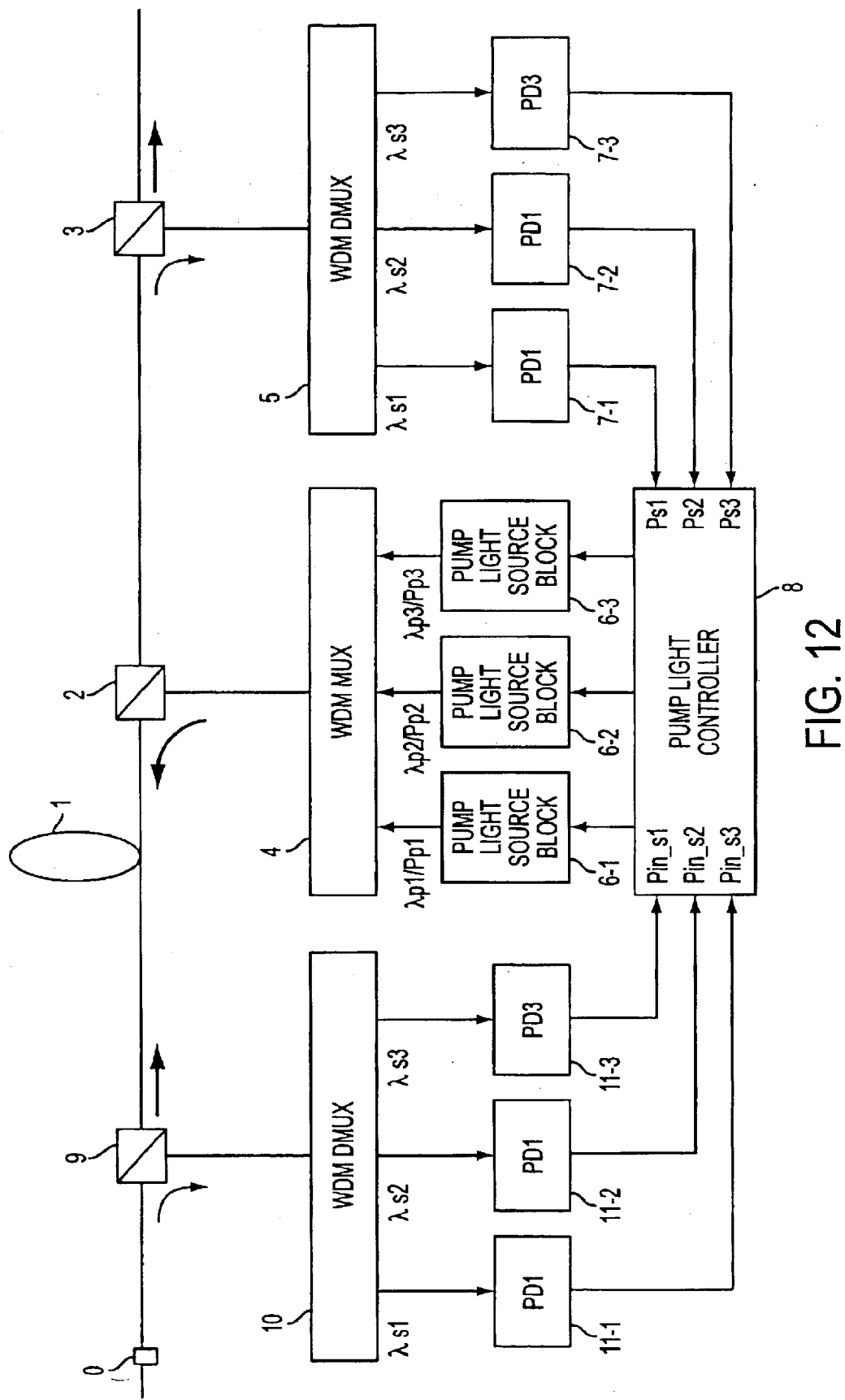
FIG. 12 is a diagram illustrating a Raman amplifier, according to an embodiment of the present invention.

FIG. 12 is a diagram illustrating a Raman amplifier, according to an additional embodiment of the present invention. In FIG. 12, a branching coupler 9, a wavelength demultiplexing coupler 10 and light receiving elements 11-1, 11-2 and 11-3 are also used to provide a monitor block, in addition to elements of FIG. 3.

In FIG. 12, a plurality of wavelength-multiplexed signals are provided the input port 0 of the Raman amplifier. The branching coupler 9 is a light splitter provided at the input port 0 to branch the wavelength-multiplexed signals by, for example, a 10:1 ratio.

The wavelength demultiplexing coupler 10 is a wavelength band branching coupler for dividing the Raman gain wavelength band generated from the pump light transmitted from the pump light source blocks 6-1, 6-2 and 6-3 into the three wavelength bands (monitor blocks), in a similar manner as the wavelength demultiplexing coupler 5. Namely, wavelength demultiplexing coupler 10 is a wavelength demultiplexing filter for demultiplex the Raman gain wavelength band into monitor blocks 1, 2 and 3 of the wavelength band.

The light receiving elements 11-1, 11-2 and 11-3 convert the optical power of the monitor blocks 1, 2 and 3, respectively.

Regarding monitor blocks 1, 2 and 3 isolated by the wavelength demultiplexing coupler 10, the average output power of the average wavelength $\lambda_{s1}$ of the monitor block 1 is defined as $P_{in\_s1}$, the average output power of the average wavelength $\lambda_{s2}$ of the monitor block 2 is defined as $P_{in\_s2}$, and the average output power of the average wavelength $\lambda_{s3}$ of the monitor block 3 is defined as $P_{in\_s3}$.

The main signal light is incident to the back pumped Raman amplifying medium 1.

The pump light source blocks 6-1, 6-2 and 6-3 may be constructed, for example, as illustrated in FIG. 10 or may be realized in various embodiments like that for the embodiment in FIG. 3.

The signal amplified with the amplifying medium 1 is branched with branching coupler 3 by, for example, a 10:1 ratio, and divided into the three wavelength band blocks like that of the wavelength demultiplexing coupler 10.

The wavelength band of the wavelength demultiplexing coupler 5 respectively corresponds to the average wavelengths $\lambda_{s1}, \lambda_{s2}, \lambda_{s3}$ of the monitor block of the wavelength branching coupler 10. The wavelength multiplex output power is photo-electrically converted in the light receiving elements 7-1, 7-2 and 7-3.

As with FIG. 3, the average output power of the average wavelength $\lambda_{s1}$ of the monitor block 1 of the wavelength demultiplexing coupler 5 is defined as $P_{s1}$, the average output power of the average wavelength $\lambda_{s2}$ of the monitor block 2 is defined as $P_{s2}$, and the average output power of the average wavelength $\lambda_{s3}$ of the monitor block 3 is defined as $P_{s3}$.

The pump light controller 8 controls the gain to a predetermined value with the monitor input from the light receiving elements 7-1, 7-2, 7-3, 11-1, 11-2 and 11-3.

Practical operations of the pump light controller 8 in FIG. 12 are explained below.

The average gains $G_1, G_2, G_3$ of monitor blocks 1, 2 and 3, respectively, can be obtained by subtracting $P_{in\_s1}, P_{in\_s2}, P_{in\_s3}$ obtained with the light receiving elements 11-1, 11-2 and 11-3 through isolation with the wavelength demultiplexing coupler 10 in the input port side from $P_{s1}, P_{s2}, P_{s3}$ obtained with the light receiving elements 7-1, 7-2 and 7-3, respectively $$G_1 = P_{s1} - P_{in\_s1}$$

$$G_2 = P_{s2} - P_{in\_s2}$$

$$G_3 = P_{s3} - P_{in\_s3} \quad \text{Formula 8}$$

The pump light average output power of each monitor block and the wavelength light average gain of each monitor block may be coupled with the average gain coefficient of each monitor block and when the pump light average output power variation amount is $\Delta P_p$, the signal light average output power variation amount is $\Delta G$, and the average gain coefficient is A.

$$\Delta G = A \cdot \Delta P_p \quad \text{Formula 9}$$

[A] used in the embodiment for FIG. 3 indicates gradient of the signal light average output power of the pump light average output power. Therefore, the following relationship can also be established for the gain A defined here.

$$\begin{bmatrix} \Delta G_1 \\ \Delta G_2 \\ \Delta G_3 \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} \Delta P_{p1} \\ \Delta P_{p2} \\ \Delta P_{p3} \end{bmatrix} \quad \text{Formula 10}$$

Here, the target gain level is defined as average gain $G_f$ of the total wavelength band, the average gain of each monitor block is defined as $G_1, G_2, G_3$, the difference of $G_f$ and $G_1$ is defined as $\Delta G_1$, the difference of $G_f$ and $G_2$ as $\Delta G_2$ and the difference of $G_f$ and $G_3$ as $\Delta G_3$.

$$\Delta G_1 = |G_f - G_1|$$

$$\Delta G_2 = |G_f - G_2|$$

$$\Delta G_3 = |G_f - G_3| \quad \text{Formula 11}$$

In order to make small the gain wavelength deviation (tilt) in the total wavelength band, the average gain among monitor blocks is set equally to match with the average gain $G_f$ of the total wavelength band.

Here, all wavelengths can be controlled to the constant gain by setting $G_f$ to the predetermined value for obtaining the constant gain.

$$\Delta G_1 \approx \Delta G_2 \approx \Delta G_3 \quad \text{Formula 12}$$

Therefore, it is possible to calculate $\Delta P_{p1}, \Delta P_{p2}, \Delta P_{p3}$ from the Formula 13 using the Formula 11.

$$\begin{bmatrix} \Delta P_{p1} \\ \Delta P_{p2} \\ \Delta P_{p3} \end{bmatrix} = \begin{bmatrix} A_{11} & A_{12} & A_{13} \\ A_{21} & A_{22} & A_{23} \\ A_{31} & A_{32} & A_{33} \end{bmatrix}^{-1} \begin{bmatrix} \Delta G_1 \\ \Delta G_2 \\ \Delta G_3 \end{bmatrix} \quad \text{Formula 13}$$

Namely, the pump light controller 8 obtains total output of the monitor block of the wavelength multiplex light, executes the process to obtain the average value by dividing total output of the monitor block with the number of channels and controls the pump light source blocks of the monitor block by calculating the necessary average output difference of pump light considering the influence of the gain by each pump light source block on the wavelength of each monitor block in view of making small the gain difference in the total wavelength band.

The feedback controls are repeated, for example, up to ten (10) times until the wavelength characteristic deviation (tilt) of the gain of each monitor block of the Raman optical amplifier is eliminated.

Figure 13:
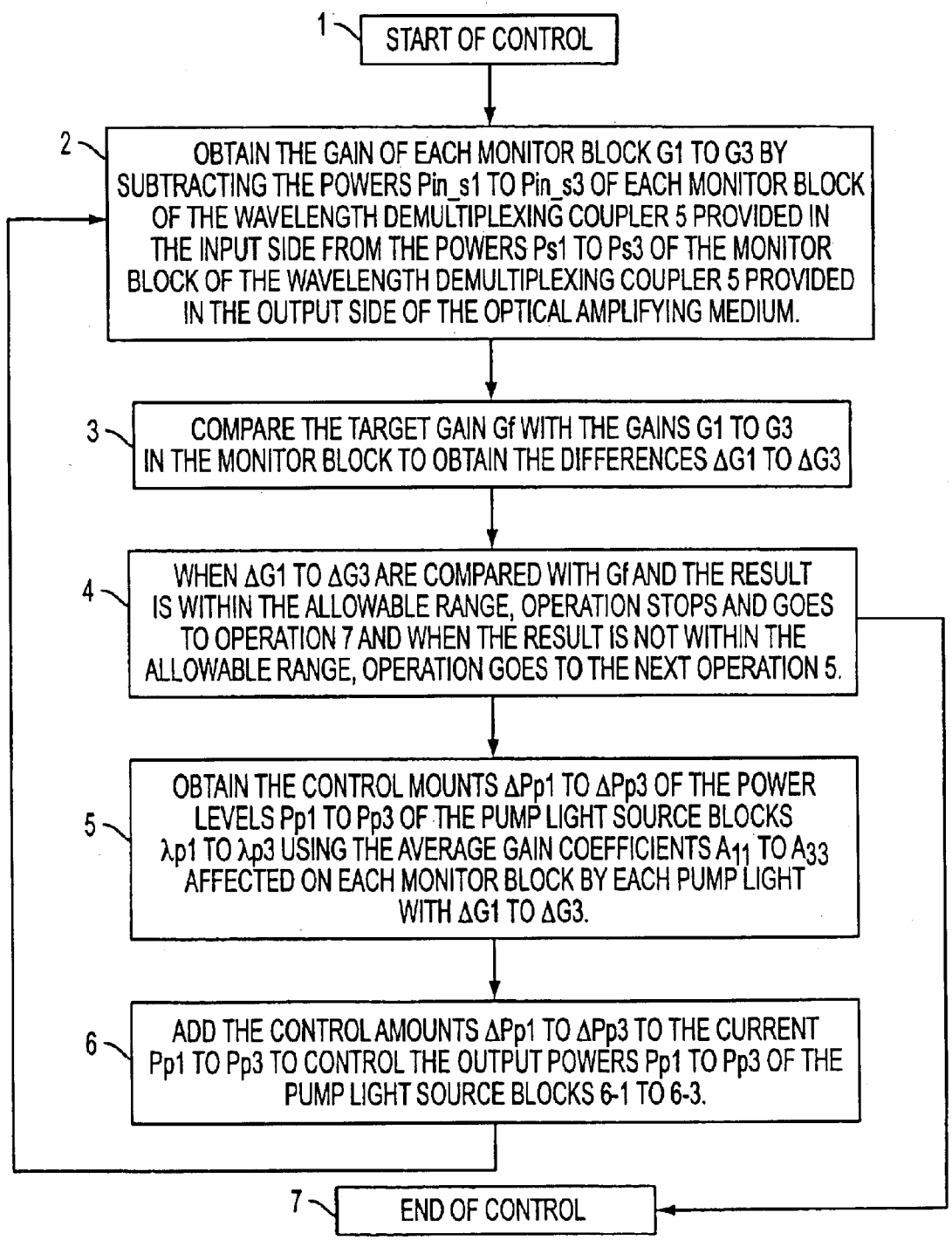
FIG. 13 is a flowchart illustrating the operation of a pump light controller in FIG. 12, according to an embodiment of the present invention.

FIG. 13 is a flowchart illustrating the operation of the pump light controller 8 in FIG. 12, according to an embodiment of the present invention. Referring now to FIG. 13, in operation 1, the control is started.

From operation 1, the process moves to operation 2, where the gains $G_1, G_2$ and $G_3$ of the monitor block are obtained, respectively, by subtracting the powers $P_{in\_s1}, P_{in\_s2}, P_{in\_s3}$ of the monitor blocks of the wavelength demultiplexing coupler 5 provided in the input side from the powers $P_{S1}, P_{s2},$ and $P_{s3}$, respectively, of the monitor blocks of the wavelength demultiplexing coupler 5 provided in the output side of the optical amplifying medium 1.

From operation 2, the process moves to operation 3, where the target gain $G_f$ is compared with the gains $G_1, G_2$ and $G_3$ in the monitor blocks to obtain the differences.

From operation 3, the process moves to operation 4, where the difference between $\Delta G_1, \Delta G_2$ and $G_f$ is determined. When difference is within an allowable range in operation 4, the process moves to operation 7, where the process stops. When difference is not within the allowable range in operation 4, the process moves to operation 5.

In operation 5, control amounts $\Delta P_{p1}$, $\Delta P_{p2}$ and $\Delta P_{p3}$ of the power levels Pp1, Pp2 and Pp3, respectively, of the pump light source blocks $\lambda_{p1}$, $\lambda_{p2}$ and $\lambda_{p3}$, respectively, are obtained from $\Delta G_1$, $\Delta G_2$ and $\Delta G_3$ using the average gain coefficients $A_{11}$ to $A_{33}$ which affects on each monitor block with each pump light.

From operation 5, the process moves to operation 6, where the output powers $P_{p1}$, $P_{p2}$ and $P_{p3}$ of the pump light source blocks 6-1, 6-2 and 6-3, respectively, are controlled by adding the control amounts $\Delta P_{p1}$, $\Delta P_{p2}$ and $\Delta P_{p3}$ to the current $P_{p1}$, $P_{p2}$ and $P_{p3}$, respectively.

With the flow explained above, the pump light controller 8 controls the individual pump light source blocks. In the embodiment of FIG. 12, like the embodiment of FIG. 3, the number of pump light source blocks and monitor blocks may be set freely.

Namely, when the number of pump light source blocks is set to n, while the number of monitor blocks is set to m, the Formula 10, Formula 11, Formula 12 and Formula 13 may be updated as follows.

$$G_1 = P_{s1} - P_{in\_s1}$$
$$G_2 = P_{s2} - P_{in\_s2}$$
$$G_3 = P_{s3} - P_{in\_s3} \qquad \text{Formula 14}$$

$$\begin{bmatrix} \Delta G_1 \\ \Delta G_2 \\ \vdots \\ \Delta G_m \end{bmatrix} = \begin{bmatrix} A_{11} & A_{12} & \vdots & A_{1n} \\ A_{21} & A_{22} & \vdots & A_{2n} \\ \vdots & \vdots & \vdots & \vdots \\ A_{m1} & A_{m2} & \vdots & A_{mn} \end{bmatrix} \begin{bmatrix} \Delta P_{p1} \\ \Delta P_{p2} \\ \vdots \\ \Delta P_{p_n} \end{bmatrix} \qquad \text{Formula 15}$$

$$\Delta G_1 = |G_f - G_1|$$
$$\Delta G_2 = |G_f - G_2|$$
$$\Delta G_m = |G_f - G_m| \qquad \text{Formula 16}$$

$$\Delta G_1 \approx \Delta G_2 \approx \Delta G_m \qquad \text{Formula 17}$$

$$\begin{bmatrix} \Delta P_{p_1} \\ \Delta P_{p_2} \\ \vdots \\ \Delta P_{p_n} \end{bmatrix} = A^{-1} \begin{bmatrix} \Delta G_1 \\ \Delta G_2 \\ \vdots \\ \Delta G_m \end{bmatrix} \qquad \text{Formula 18}$$

Thus, the pump light controller 8 could be designed in accordance with the above formula.

In the embodiment of FIG. 12, the number of pump light source blocks and monitor blocks can be set freely as in the case of the embodiment of FIG. 3, but it is preferable that the number of monitor blocks is set less than the number of signal light channels multiplexed in the wavelength multiplex signal, and exceeding the number of pump light source blocks.

Moreover, as with the embodiment of FIG. 3, the embodiment of FIG. 12 can freely use, as the Raman amplifying medium, a dispersion compensation fiber (DCF) resulting in small effective sectional area and large non-linearity, a dispersion shift fiber (DSF) and a non-zero dispersion shift fiber (NZDSF) as well as the ordinary 1.3 zero-micron fiber.

When an optical fiber operating as the Raman amplifying medium 1 has a large non-linearity, the fiber can be relatively short in length, while providing centralized amplification.

Moreover, when an optical fiber operating as the Raman amplifying medium 1 has a small effective cross-sectional area and intensive non-linearity, the Raman amplifying medium 1 can be structured in short length. However, when an ordinary 1.3 $\mu$m zero-discrete fiber is used, a length of about 40 km or longer will probably be required depending on the pump power.

Figure 14:
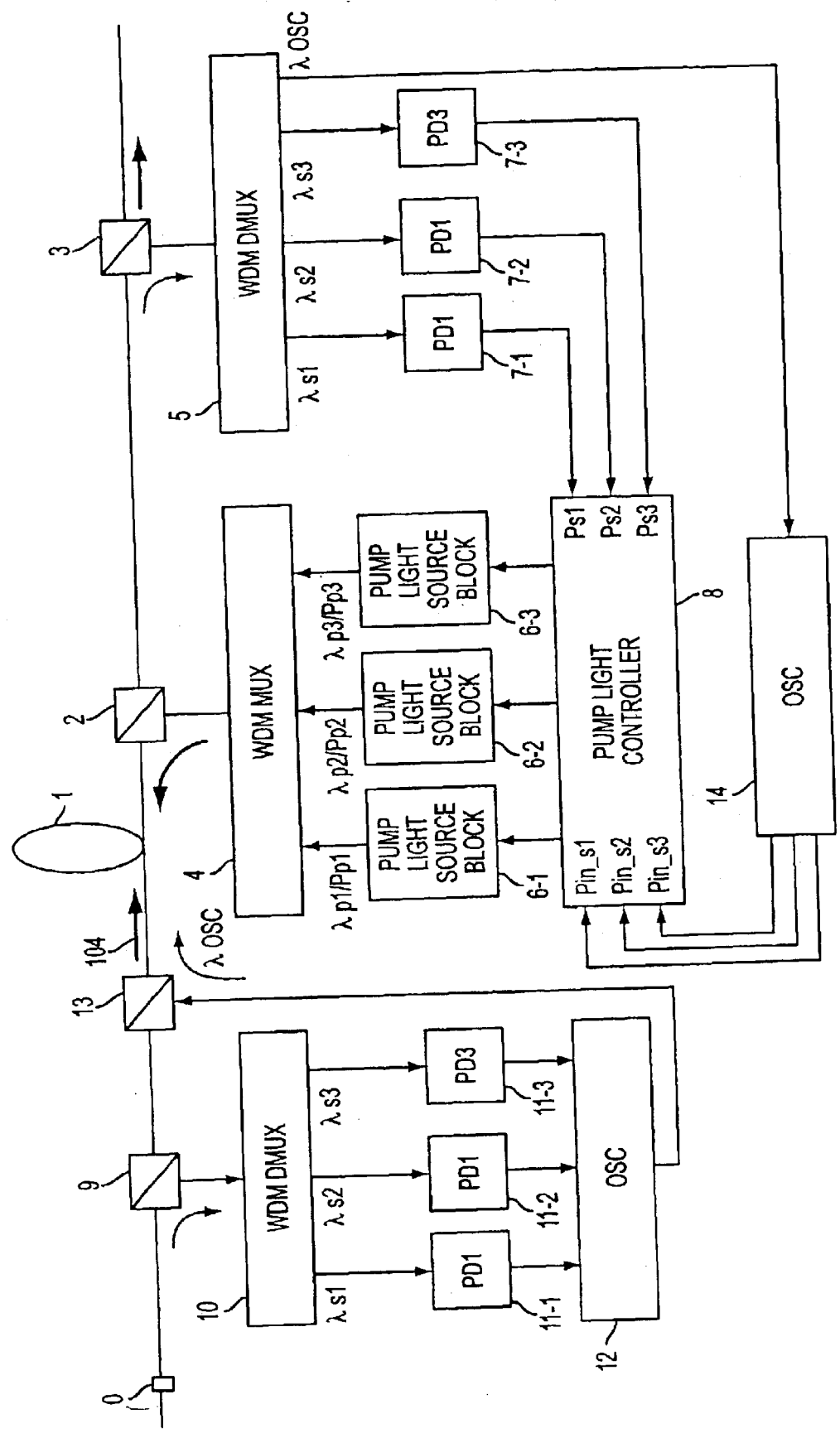
FIG. 14 is a diagram illustrating a Raman amplifier, according to an embodiment of the present invention.

FIG. 14 is a diagram illustrating a Raman amplifier, according to a further embodiment of the present invention. More specifically, FIG. 14 illustrates an example where input of the wavelength multiplex light of the Raman amplifier of FIG. 12 is notified using the actual transmission line.

Referring now to FIG. 14, a monitor controller (OSC) 12 detects the power of each monitor block and transmits information of the result to the Raman amplifying medium 1 as the transmission line via a multiplexing coupler 13 in the wavelength of $\lambda_{osc}$. The signal of wavelength $\lambda_{osc}$ is demultiplexed with the wavelength demultiplexing coupler 5 and detected with a monitor controller (OSC) 14 and is then supplied to the pump optical controller 8.

In FIG. 14, the wavelength $\lambda_{osc}$ is demultiplexed with the wavelength demultiplexing coupler 5, but it is possible to additionally provide a branching coupler to the transmission line and to branch the monitor control signal and input this signal to the monitor controller 14.

In FIG. 13, the gain can be kept constant even when the Raman amplifying medium 1 is used in the transmission line through the embodiment explained above in the gain wavelength band of the amplifying medium 1 with the pump light from the pump light source block using the same value of $G_f$ for all monitor blocks. The gain weighted for each wavelength band of each monitor block can be controlled to the constant value by setting the other gain $G_f$ for each monitor block.

In addition, as with the embodiment in FIG. 3, with the embodiment in FIG. 12, the weighting process can be performed constantly to $G_f$ for all wavelength blocks and it is also possible to conduct the weighting process by providing variable or fixed optical attenuators 71 to 73 in the preceding stage of the light receiving elements in unit of monitor block.

In the embodiment of FIG. 12, the monitor block is formed via the wavelength demultiplexing couplers 5 and 10, and light receiving elements 7-1, 7-2, 7-3, 11-1, 11-2 and 11-3, but these may be replaced with the spectrum analyzers.

The embodiments in FIGS. 3 and 13 can be combined with an optical amplifier using a rare-earth doped fiber (for example, an erbium-doped fiber).

Figure 15:
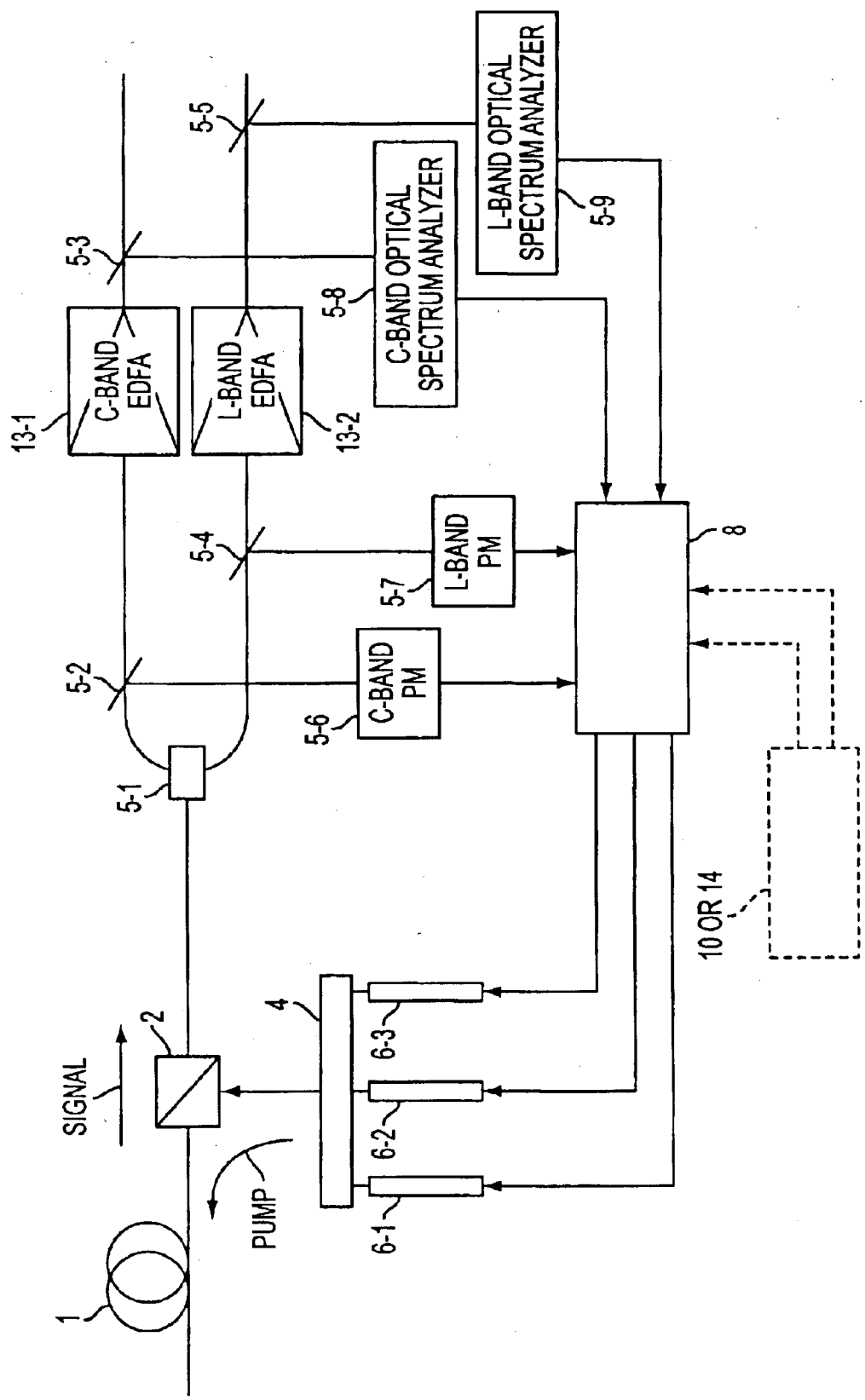
FIG. 15 is a diagram illustrating a Raman amplifier, according to an additional embodiment of the present invention.

For example, FIG. 15 is a diagram illustrating a Raman amplifier, according to an additional embodiment of the present invention. Referring now to FIG. 15, a first rare-earth doped fiber amplifier 13-1, a second rare-earth doped fiber amplifier 13-2, a wavelength band demultiplexing coupler 5-1, branching couplers 5-2, 5-3, 5-4 and 5-5, a first wavelength band monitor 5-6, a second wavelength band monitor 5-7, a first spectrum analyzer 5-8 and a second spectrum analyzer 5-9 are provided.

The wavelength band demultiplexing coupler 5-1 divides the wavelength multiplex light amplified with the Raman amplifying medium 1 to a first wavelength band (C-band: 1530 nm to 1557 nm) and a second wavelength band (L-band: 1570 nm to 1610 nm) and then outputs these divided wavelength bands.

The first rare-earth doped fiber amplifier 13-1 is an optical amplifier formed of an erbium-doped fiber (EDF) having the gain for the first wavelength band. The second rare-earth doped fiber amplifier 13-2 is an optical amplifier formed of an erbium-doped fiber (EDF) having the gain for the second wavelength band.

One light branched with the wavelength band demultiplexing coupler 5-1 is amplified by the first rare-earth doped fiber amplifier in the first wavelength band, and the other light branched with wavelength band demultiplexing coupler 5-1 is amplified by the second rare-earth doped fiber amplifier in the second wavelength band.

The branching couplers 5-2, 5-3 are branching couplers for branching the light of the first wavelength band in the ratio of, for example, 10:1. The branching couplers 5-4, 5-5 are branching couplers for branching the light of the second wavelength band in the ratio of, for example, 10:1.

The first wavelength band monitor 56 monitors the power of the first wavelength band light branched with the branching coupler 5-2. The second wavelength band monitor 5-7 monitors the power of the second wavelength band light branched with the branching coupler 5-4.

The pump light controller 8 calibrates the output powers of the first spectrum analyzer 5-8 and second spectrum analyzer 5-9 based on the outputs of the first and second wavelength monitors 5-6 and 5-7. Outputs of the spectrum analyzers 5-8 and 5-9 are divided to the wavelength band blocks of, for example, 1528.773 to 1552.122 nm, 1552.524 to 1563.455 nm, 1570.416 to 1581.601 nm, and 1582.018 to 1607.035 nm, to obtain the average output of each monitor block in view of controlling the pump lights 6-1, 6-2 and 6-3.

In the embodiment of FIG. 12, it is possible to use an output of the wavelength demultiplexing coupler 10 of FIG. 12 and FIG. 14 and use a method for detecting the signal before Raman amplification from the monitor controller 14 using the monitor control wavelength signal OSC.

According to the above embodiments of the present invention, a plurality of pump light sources are used to realize a wideband Raman amplifier with flattening of the wavelength characteristic of output and gain. The present invention enables control of wavelength characteristic deviation of output power and gain, control of constant output, and control of constant gain using a simplified control algorithm. In various embodiments of the present invention, the number of wavelength bands for monitoring an amplified light are higher than the number of individual blocks forming a pump light source block and lower than the number of signal channels.

In the various examples provided herein, specific wavelengths, frequencies and other values are provided for explanation purposes. However, the present invention is not limited to such specific wavelengths, frequencies or other values.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical amplifier for amplifying a wavelength division multiplexed (WDM) light including signal lights wavelength division multiplexed together, the amplifier comprising:

an optical amplifying medium through which the WDM light travels and is thereby amplified via Raman amplification in accordance with multiplexed pump lights of different wavelengths traveling through the optical amplifying medium;

an optical device dividing the amplified WDM light into first and second divided lights in first and second wavelength bands, respectively;

a first optical amplifier amplifying the first divided light, the first optical amplifier having a gain band including the first wavelength band;

a second optical amplifier amplifying the second divided light, the second optical amplifier having a gain band including the second wavelength band; and a controller controlling power of each pump light based on a power of the first divided light amplified by the first optical amplifier and a power of the second divided light amplified by the second optical amplifier.

2. An optical amplifier as claimed in claim 1, wherein the first wavelength band is divided into a plurality of first individual wavelength bands, the second wavelength band is divided into a plurality of second individual wavelength bands, and the controller controls power of each pump light based on a wavelength characteristic of gain generated in the first individual wavelength bands and the second individual wavelength bands.

3. An optical amplifier as claimed in claim 1, wherein the first wavelength band is C-band and the second wavelength band is L-band.

4. An optical amplifier as claimed in claim 1, wherein the first wavelength band is C-band, the second wavelength band is L-band, the first optical amplifier is a C-band erbium doped fiber amplifier and the second optical amplifier is an L-band erbium doped fiber amplifier.

5. An optical amplifier as claimed in claim 2, wherein the first wavelength band is C-band and the second wavelength band is L-band.

6. An optical amplifier as claimed in claim 2, wherein the first wavelength band is C-band, the second wavelength band is L-band, the first optical amplifier is a C-band erbium doped fiber amplifier and the second optical amplifier is an L-band erbium doped fiber amplifier.

7. An optical amplifier as claimed in claim 2, wherein the controller controls the power of each pump light to reduce a wavelength characteristic deviation of power between the first and second individual wavelength bands.

8. An optical amplifier as claimed in claim 2, wherein the controller controls the power of each pump light to set a power of each first and second individual wavelength band to be equal.

9. An optical amplifier for amplifying a wavelength division multiplexed (WDM) light including signal lights wavelength division multiplexed together, the amplifier comprising:

an optical amplifying medium through which the WDM light travels and is thereby amplified via Raman amplification in accordance with multiplexed pump lights of different wavelengths traveling through the optical amplifying medium;

an optical device dividing the amplified WDM light into first and second divided lights in first and second wavelength bands, respectively;

a first optical amplifier amplifying the first divided light, the first optical amplifier having a gain band including the first wavelength band;

a second optical amplifier amplifying the second divided light, the second optical amplifier having a gain band including the second wavelength band; and a controller controlling output powers of the pump lights In accordance with a difference in power of the first divided light before and after being amplified by the first optical amplifier, and with a difference in power of the second divided light before and after being amplified by the second optical amplifier.

10. An optical amplifier as claimed in claim 9, wherein the first wavelength band is divided into a plurality of first individual wavelength bands, the second wavelength band is divided into a plurality of second individual wavelength bands, and the controller controls output powers of the pump lights in accordance with differences in power of the first divided light in each first individual wavelength band before and after being amplified by the first optical amplifier, and in accordance with differences in power of the second divided light in each second individual wavelength band before and after being amplified by the second optical amplifier.

11. An optical amplifier as claimed in claim 9, wherein the first wavelength band is C-band and the second wavelength band is L-band.

12. An optical amplifier as claimed in claim 9, wherein the first wavelength band is C-band, the second wavelength band is L-band, the first optical amplifier is a C-band erbium doped fiber amplifier and the second optical amplifier is an L-band erbium doped fiber amplifier.

13. An optical amplifier as claimed in claim 10, wherein the first wavelength band is C-band and the second wavelength band is L-band.

14. An optical amplifier as claimed in claim 10, wherein the first wavelength band is C-band, the second wavelength band is L-band, the first optical amplifier is a C-band erbium doped fiber amplifier and the second optical amplifier is an L-band erbium doped fiber amplifier.

15. An optical amplifier as claimed in claim 10, wherein the controller controls the power of each pump light to reduce a wavelength characteristic deviation of power between the first and second individual wavelength bands.

16. An optical amplifier as claimed in claim 10, wherein the controller controls the power of each pump light to set a power of each first and second individual wavelength band to be equal.

17. An optical amplifier for amplifying a wavelength division multiplexed (WDM) light including signal lights wavelength division multiplexed together, the amplifier comprising:

an optical amplifying medium through which the WDM light travels and is thereby amplified via Raman amplification in accordance with multiplexed pump lights of different wavelengths traveling through the optical amplifying medium;

an optical device dividing the amplified WDM light into first and second divided lights in first and second wavelength bands, respectively;

a first optical amplifier amplifying the first divided light, the first optical amplifier having a gain band including the first wavelength band;

a second optical amplifier amplifying the second divided light, the second optical amplifier having a gain band including the second wavelength band; and means for controlling power of each pump light based on a power of the first divided light amplified by the first optical amplifier and a power of the second divided light amplified by the second optical amplifier.

18. A method comprising:

causing a wavelength division multiplexed (WDM) light to travel through an optical amplifying medium to thereby amplify the WDM light via Raman amplification in accordance with multiplexed pump lights of different wavelengths traveling through the optical amplifying medium, the WDM light including signal lights wavelength division multiplexed together;

dividing the amplified WDM light into first and second divided lights in first and second wavelength bands, respectively;

amplifying the first divided light with a first optical amplifier having a gain band including the first wavelength band;

amplifying the second divided light with a second optical amplifier having a gain band including the second wavelength band; and controlling power of each pump light based on a power of the amplified first divided light and a power of the amplified second divided light.

19. A method comprising:

causing a wavelength division multiplexed (WDM) light to travel through an optical amplifying medium to thereby amplify the WDM light via Raman amplification in accordance with multiplexed pump lights of different wavelengths traveling through the optical amplifying medium, the WDM light including signal lights wavelength division multiplexed together;

dividing the amplified WDM light into first and second divided lights in first and second wavelength bands, respectively;

amplifying the first divided light with a first optical amplifier having a gain band including the first wavelength band;

amplifying the second divided light with a second optical amplifier having a gain band including the second wavelength band; and controlling output power of the pump lights in accordance with a difference in power of the first divided light before and after being amplified by the first optical amplifier, and a difference in power of the second divided light before and after being amplified by the second optical amplifier.

* * * * *

UNITED STATES PATENT AND TRADEMARK OFFICE
CERTIFICATE OF CORRECTION

PATENT NO. : 6,891,661 B2  Page 1 of 1
DATED : May 10, 2005
INVENTOR(S) : Etsuko Hayashi et al.

It is certified that error appears in the above-identified patent and that said Letters Patent is hereby corrected as shown below:

<u>Title page,</u>
Item [56], References Cited, FOREIGN PATENT DOCUMENTS, change (2nd occurrence) "G02F/1/35" to -- G02F/135 --.

<u>Column 18,</u>
Line 67, change "In" to -- in --.

<u>Column 20,</u>
Line 50, after "output" delete "power" and insert -- powers --.

Signed and Sealed this

Fourth Day of April, 2006

JON W. DUDAS
*Director of the United States Patent and Trademark Office*